United States Patent [19]
Creusere

[11] Patent Number: 6,148,111
[45] Date of Patent: Nov. 14, 2000

[54] PARALLEL DIGITAL IMAGE COMPRESSION SYSTEM FOR EXPLOITING ZEROTREE REDUNDANCIES IN WAVELET COEFFICIENTS

[75] Inventor: Charles David Creusere, Ridgecrest, Calif.

[73] Assignee: The United States of America as represented by the Secretary of the Navy, Washington, D.C.

[21] Appl. No.: 09/071,454

[22] Filed: Apr. 27, 1998

[51] Int. Cl.[7] .............................. G06K 9/36; H04N 7/12
[52] U.S. Cl. ..................... 382/240; 382/234; 382/248; 348/408
[58] Field of Search ..................... 382/240, 232, 382/234, 248, 249, 233, 226; 348/398, 397, 390, 408; 341/79; 345/505

[56] References Cited

U.S. PATENT DOCUMENTS

| | | | |
|---|---|---|---|
| 4,622,632 | 11/1986 | Tanimoto et al. | 712/11 |
| 5,315,670 | 5/1994 | Shapiro | 382/56 |
| 5,321,776 | 6/1994 | Shapiro | 382/56 |
| 5,412,741 | 5/1995 | Shapiro | 382/232 |
| 5,481,308 | 1/1996 | Hartung et al. | 348/398 |
| 5,563,960 | 10/1996 | Shapiro | 382/239 |
| 5,602,589 | 2/1997 | Vishwanath | 348/398 |
| 5,638,068 | 6/1997 | Nickerson | 341/67 |
| 5,694,171 | 12/1997 | Katto | 348/405 |
| 5,923,338 | 7/1999 | Rich | 345/505 |

OTHER PUBLICATIONS

"An Array Processor Approach for Low Bit Rate Video Coding," Cornelis Hoek, et al., Signal Processing: Image communication 1 (1989) 213–223.

*Primary Examiner*—Thomas D. Lee
*Assistant Examiner*—Wenpeng Chen
*Attorney, Agent, or Firm*—David Kalmbaugh

[57] ABSTRACT

An image compression system for implementing a zerotree wavelet compression algorithm. The compression system uses a wavelet based coding system which takes advantage of the correlation between insignificant coefficients at different scales. The compression system uses parallel arrays of processing elements which include single instruction multiple data processors in its encoder and decoder to increase throughput and scalability. A single instruction decoder forces each processing element of the array to perform exactly the same operation on its data as the other processor elements of the array are performing on their data. If an operation must be performed only by some of the processing elements of the array, then those processing elements not performing the operation are turned off for one instruction cycle. The algorithm of the compression system is partitioned into two major components which are the wavelet transform and zerotree computations. In the encoder the wavelet transform and zerotree computations are performed on the single instruction multiple data processor array while an output processor performs lossless arithmetic coding on the symbols output from the array. Partitioning the algorithm allows the encoder to achieve an enhanced rate-distortion performance with increased throughput since computationally complex operations are performed in parallel. The decoder also achieves increased throughput since the computationally complex operations are performed in parallel.

7 Claims, 20 Drawing Sheets

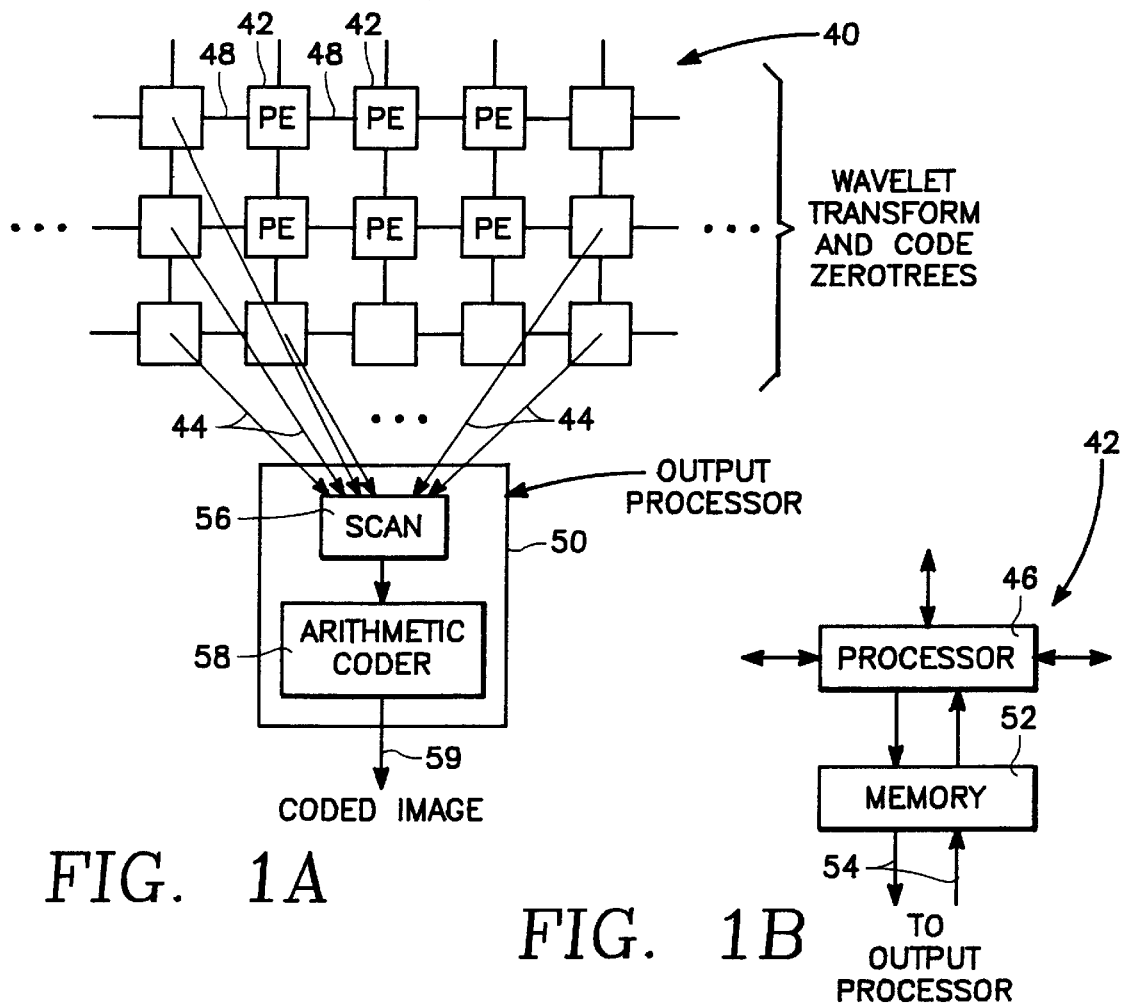
FIG. 1A
FIG. 1B
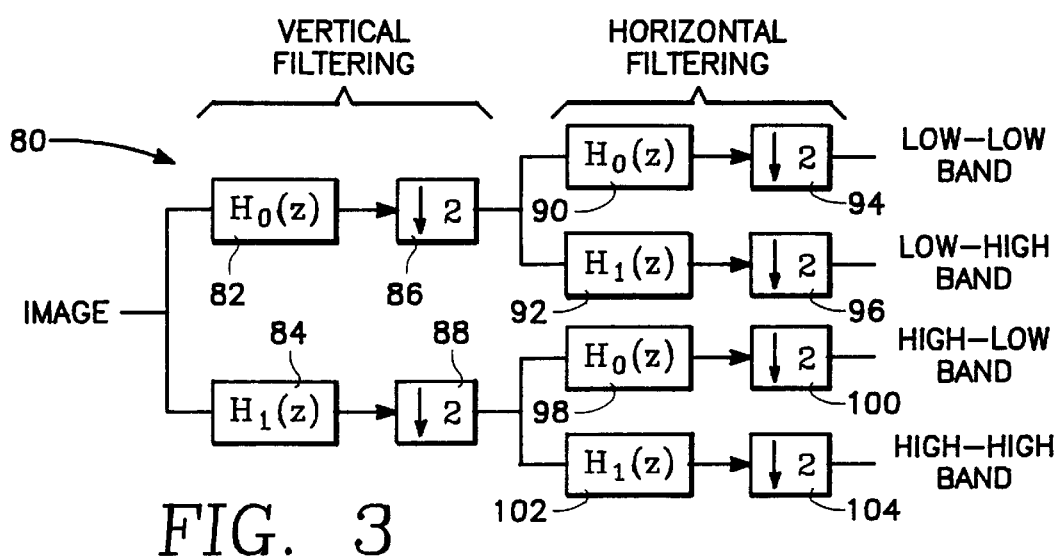
FIG. 3

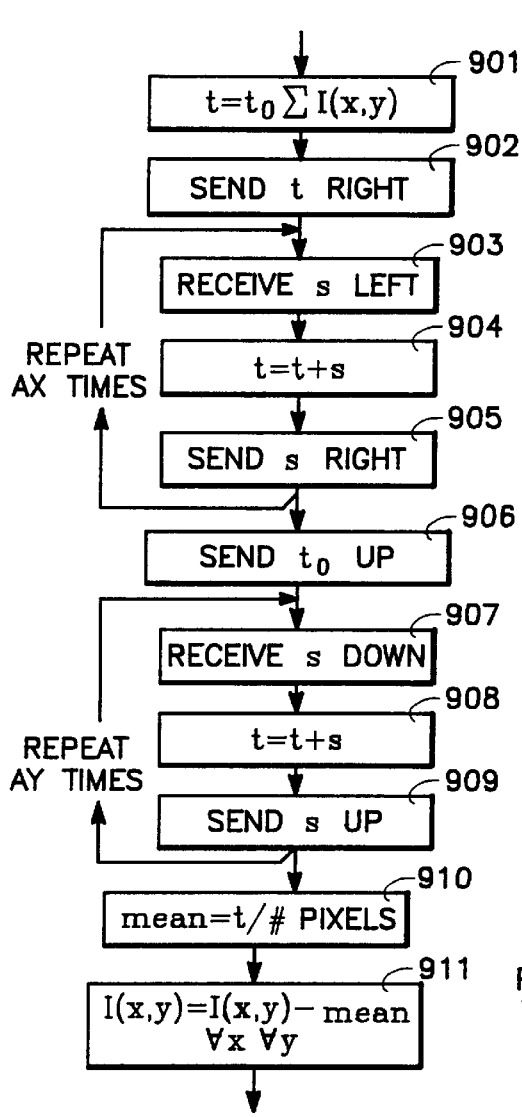
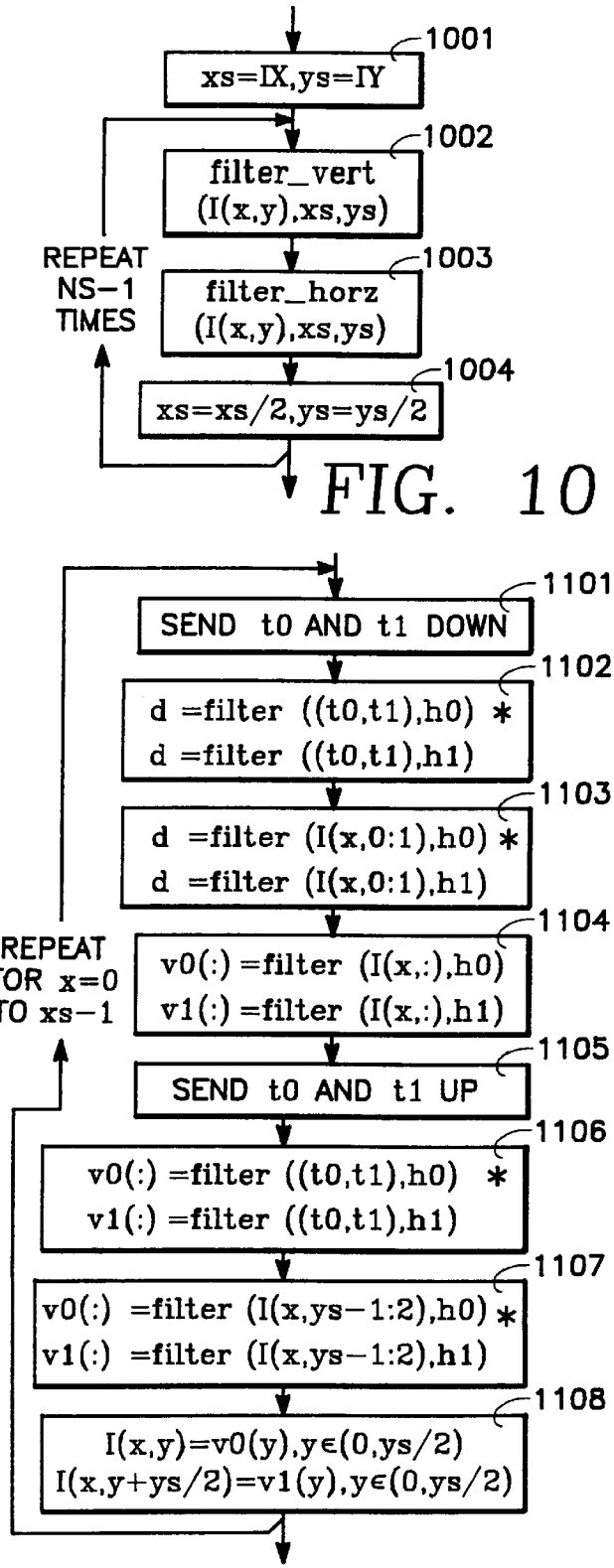
FIG. 9
FIG. 10
FIG. 11

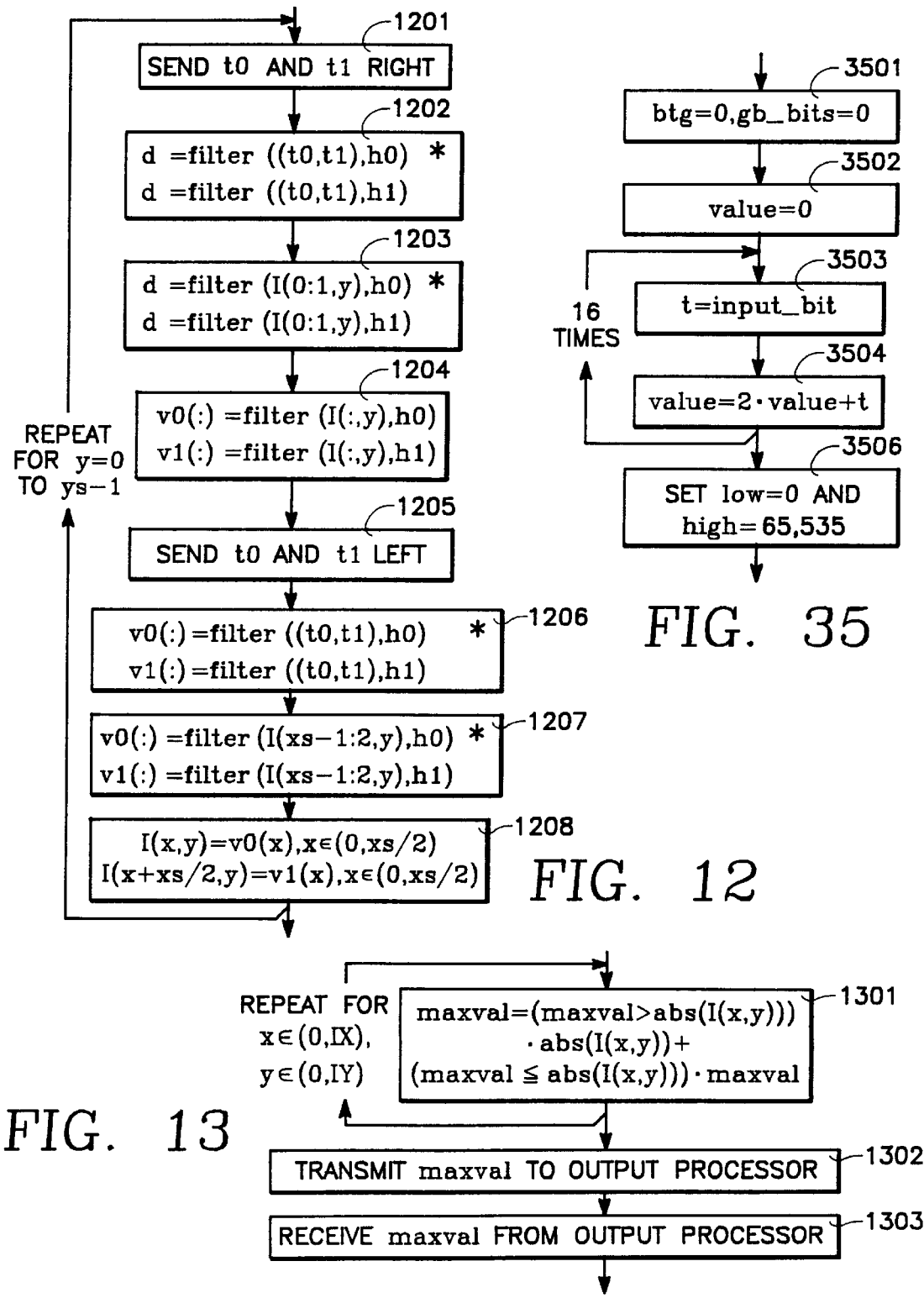

PARALLEL DIGITAL IMAGE COMPRESSION SYSTEM FOR EXPLOITING ZEROTREE REDUNDANCIES IN WAVELET COEFFICIENTS

BACKGROUND OF THE INVENTION

1. Field of the Invention

The present invention relates generally to data transmission and data storage. More specifically, the present invention relates to a system for the compression and decompression of digitized data using an array of single instruction multiple data parallel processors having mesh interconnected communications links.

2. Description of the Prior Art

Digital data compression system are useful to reduce the number of bits required to represent a signal in digital form. Digital data is typically compressed to either facilitate transmission of the signal through a limited-bandwidth communications channel or to reduce the amount of memory needed to store that signal on some archival media such as a computer hard disk.

Compression of digitized data can be achieved using either lossless or lossy coding techniques. Lossless coding involves only the extraction of statistical redundancy from the signal, and, thus, the amount of compression possible is signal dependent. For example, compression ratios of 2:1 are common for natural images whenever digital data representative of natural images is compressed using lossless coding techniques.

To obtain higher levels of compression of digital data or to code the signal at a fixed bit rate, some distortion must be accepted in the reconstructed signal, resulting in a loss of information when the signal is passed through an encoding system and then a decoding system. The goal of a lossy coding system, then, is to minimize the distortion introduced into the signal at all bit rates for which the lossy coding system is designed to operate, that is the user wants the best rate-distortion performance possible.

A variety of image compression algorithms and systems have been proposed in recent years. Many of the algorithms with the best rate-distortion performance such as the Joint Photographics Experts Group (JPEG) and Zerotree Coders use transforms to decorrelate image pixels before coding of the data. The JPEG standard relies on a block-based discrete cosine transform.

The zerotree coder uses a multiresolutional wavelet transform and takes advantage of the correlation between insignificant coefficients at different scales. U.S. Pat. No. 5,315,670 to James M. Shapiro discloses a digital data processing system which includes means for generating a tree structure of data representative coefficients with the tree structure having multiple paths from coefficients generated at a level of coarsest information to coefficients generated at a level of relatively finer information. The coefficients are evaluated to distinguish between significant and insignificant coefficients. Means are also included for generating a dedicated symbol representing a related association of insignificant coefficients within the tree structure, from a root coefficient of the tree structure to a set of end coefficients of the tree structure. The symbol represents that neither the root coefficient of the tree structure nor any descendant of the root coefficient has a magnitude greater than a given reference level. A coefficient is considered to be insignificant and a "root of a zerotree", whereby all descendants are predictably insignificant, if (a) the coefficient has an insignificant magnitude, (b) the coefficient is not the descendant of a root from a coarser level, and (c) all the descendants of the coefficient at finer levels have insignificant magnitudes. A coefficient found to be a zerotree root is coded with a dedicated symbol which is eventually processed by an entropy coder.

In addition, a coding algorithm based on the wavelet packet transform has recently been used to achieve the best rate-distortion performance to date on certain difficult images which require encoding.

While wavelet based compression systems generally perform adequately for their intended purpose of data compression, these wavelet-based systems are more computationally complex than systems for data compression that are based on a discrete cosine transform. The complexity of wavelet based compression systems can significantly limit real-time performance. Further, the complexity of wavelet based compression systems can significantly increase the cost of a system designed to achieve a specified performance goal.

The best (in a rate-distortion sense) wavelet-based algorithm currently available is the embedded zerotree wavelet (EZW) algorithm developed by James M. Shapiro while employed at Sarnoff Labs. Unfortunately, this algorithm executes more slowly than many other wavelet-based algorithms because of its high structural complexity, that is the embedded zerotree wavelet algorithm has a lot of repetitive scanning. Thus, implementing this sequential algorithm to achieve a high throughput rate (e.g., many image frames per second) requires very advanced processors and may be impossible to implement for the desired throughput rate.

Thus there is a need for a data compression system which will achieve high throughput speeds, scalability and efficiency in very large scale integration implementations. The data compression system should also have a compression performance equal to the sequential EZW algorithm and also should be able to provide higher throughput at a substantially reduced cost.

SUMMARY OF THE INVENTION

The parallel digital image compression system of the present invention overcomes some of the disadvantages of the prior art, including those mentioned above, in that it implements the embedded zerotree wavelet compression algorithm on an array of low-complexity single instruction multiple data (SIMD) processors allowing for far higher throughput at reduced cost. The compression system of the present invention uses a wavelet-based coding system and takes advantage of the correlation between insignificant coefficients at different scales.

The compression system of the present invention also uses parallel arrays of SIMD processors in both its encoder and decoder to greatly increase the throughput of the system and its scalability. An array of processing elements which include SIMD processors is a simple form of parallel processing which requires only a single instruction decoder for the entire array. The single instruction decoder requires each processing element of the array to perform exactly the same operation on its data as the other processing elements of the array are performing on their data.

If an operation must be performed by some of the processing elements of the array, then those processing elements not performing the operation are turned off for one instruction cycle.

The algorithm of the present invention is partitioned into two major components which are the wavelet or wavelet-packet transform and zerotree computations. In the encoder the wavelet transform and zerotree computations are performed on the single instruction multiple data processor array while a single output processor performs lossless arithmetic coding on the symbols output from the array. Partitioning the algorithm allows the encoder to achieve the same rate-distortion performance as the prior art with greatly increased throughput since computationally complex operations are performed in parallel. The decoder also achieves greatly increased throughput since computationally complex operations are performed in parallel.

BRIEF DESCRIPTION OF THE DRAWINGS

FIG. 1A is a block diagram of an image encoder used in the parallel digital image compression system which constitutes the present invention;

FIG. 1B is a block diagram of one of the processing elements of FIG. 1A;

FIG. 3 illustrates one level of a separable 2D wavelet transform which is used to analyze an image by the parallel digital image compression system;

FIG. 9 illustrates a flow chart of a method whereby the mean is computed and subtracted within the SIMD array of the image encoder of FIG. 1A;

FIG. 10 illustrates a flow chart for a 2D wavelet transform, decomposed to NS levels where the image block in a processing element is of size IX by IY;

FIG. 11 illustrates a flow chart for a vertical wavelet transform;

FIG. 12 illustrates a flow chart for a horizontal wavelet transform;

FIG. 13 illustrates a flow chart of a method for computing the maximum wavelet coefficient using the output processor of FIG. 1A;

FIG. 35 is a detailed flow chart of a method for intializing the arithmetic decoder of FIG. 2.

DETAILED DESCRIPTION OF THE PREFERRED EMBODIMENT

Figure 2:
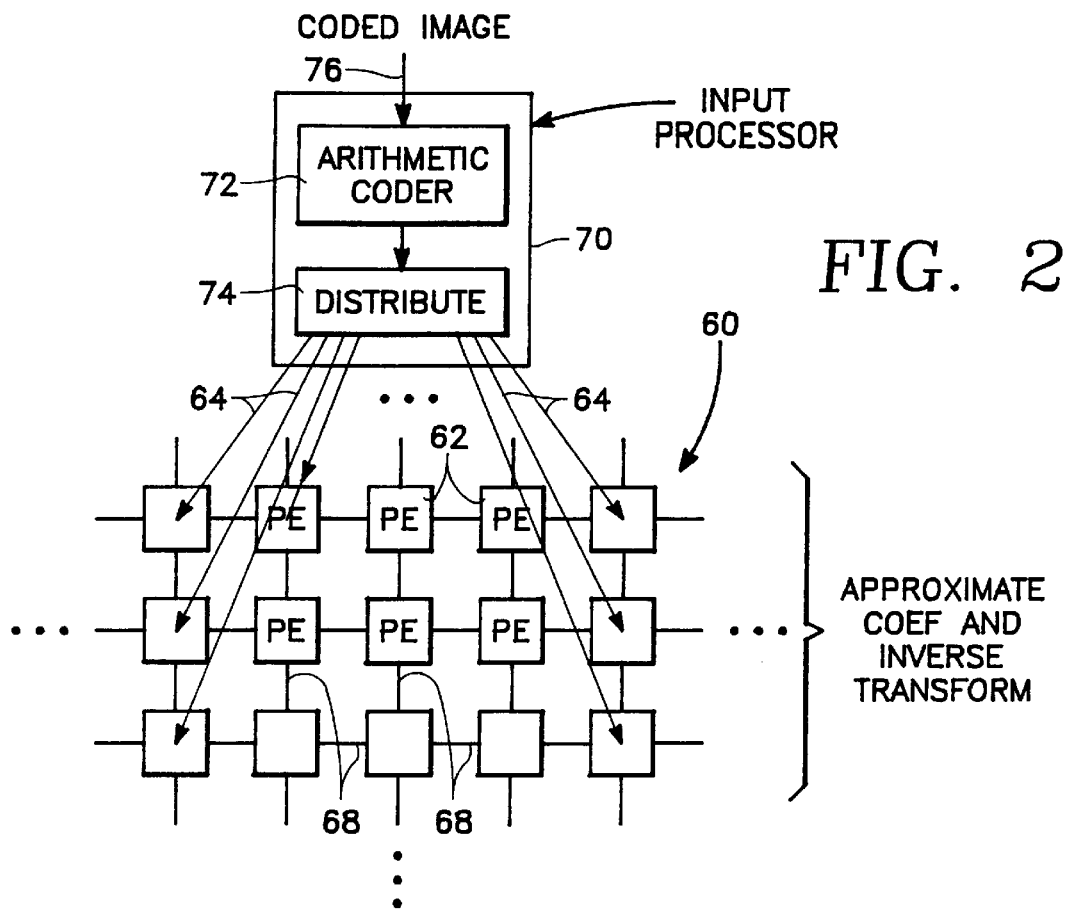
FIG. 2 is a block diagram of an image decoder used in the parallel digital image compression system which constitutes the present invention.

Referring first to FIGS. 1 and 2, the hardware configuration of the encoder 40 is shown in FIG. 1 while the hardware configuration of the decoder 60 is detailed in FIG. 2. Each node 42 of the array or two dimensional lattice of encoder 40 is called a processing element, and it communicates with its nearest neighbors, forming a two dimensional (2D) grid pattern of interconnections 48 of encoder 40. Similarly, each node 62 of the array or two dimensional lattice of decoder 60 is called a processing element, and it communicates with its nearest neighbors, forming a two dimensional (2D) grid pattern of interconnections 68 of decoder 60.

The lines 44 in FIG. 1 and lines 64 in FIG. 2 indicate the communications paths to and from the arithmetic encoder 40 and decoder 60, respectively, however these communications paths need not be implemented as physical links. The function can be accomplished very efficiently by shifting data through the mesh interconnections 48 of the array of encoder 40 and through the mesh interconnections 68 of the array of decoder 60 since the data is processed sequentially by the input processor 70 and the output processor 50.

At this time it should be noted that output processor 50 and input processor 70 may each be a commercially available digital signal processor such as an Intel Pentium processor, the Texas Instrument TMS320 family of digital signal processor or a Apple McIntosh computer.

As shown in FIG. 1A, output processor 50 includes a scan circuit/element 56 coupled to an arithmetic coder 58 which provides at its output 59 a coded image. Scan element 56 is connected to the array of processing elements 62 at the edge of the two dimensional grid pattern of interconnections 48 of encoder 40.

As shown in FIG. 2, input processor 70 includes an arithmetic decoder 72 and a distribute circuit 74 which is connected to arithmetic decoder 72. Arithmetic decoder 72 receives at its input 76 the coded image provided by output processor 50. Distribute circuit 74 is connected to the processing elements 62 at the edge of the two dimensional grid pattern of interconnections 68 of decoder 60 as is best illustrated in FIG. 2.

As shown in FIG. 1B, each processing element 42 includes a single instruction multiple data (SIMD) processor 46 coupled to a memory 52. It should be noted that each processing element 62 of FIG. 2 also includes a single instruction multiple data processor coupled to a memory (not illustrated).

Referring again to FIGS. 1A, 1B and 2, each SIMD processor 46 has direct access only to its own store of local memory 52 and must use the communications mesh or interconnections 48 to access the local memory 52 of another SIMD processor 46. If memory 52 of FIG. 1B is a dual-ported memory (e.g., video RAM), then all communications with the output processor 50 and input processor 70 of FIG. 2 can be made through memory 52. It should be noted that connection lines 54 illustrate a dual-ported memory 52.

Similarly, if the memory of each processing element 62 of decoder 60 is dual-ported then all communications with input processor 70 of FIG. 2 can be made through memory. This is the most efficient architecture for encoder 40 and decoder 60, since it allows image pixels to be loaded directly into memory without being shifted through the mesh of interconnections 48 of encoder 40 and the mesh of interconnections 68 of encoder 60.

Input and output processing requires only a 16 bit arithmetic integer and a minimal instruction set which may be accomplished by commercially available digital signal processors. When the size or rate of the input image stream is increased, then the speed of processor 50 and processor 70 is increased to maintain real-time performance.

However, if only the size of the image is increased, the speed of the individual processing elements 42 (FIG. 1) or the individual processing elements 62 (FIG. 2) in the array need not be increased since the size of the array for encoder 40 or decoder 60 can be increased, thus making the array highly scalable. In addition, the speed of the individual processing elements 42 (FIG. 1) or the individual processing elements 62 (FIG. 2) can be increased should that be more advantageous.

Each individual processing element 42 or 62 has its own local memory (memory 52 for the encoder of FIG. 1) which is not directly accessible by any other processing element 42 or 62. This, in turn, requires data transfers between processing elements 42 to be through the grid pattern of interconnections 48 of encoder 40. Further, data transfers between processing elements 62 are through the grid pattern of interconnections 68 of decoder 60.

The command set of each processing element 42 or 62 is limited. Basic integer addition and multiplication instructions are required to implement the low-complexity wavelet transforms such as the well known 5/3 and 2/6 wavelets of Daubechies, although floating point processing is required to easily implement longer wavelets. The coding portion of the algorithm requires only logical and bit test instructions. Thus, while the present invention can operate on virtually any of the commercially available SIMD processor arrays (e. g. Maspar Computer Corporation), it can be implemented even more efficiently on a VLSI chip because all of the extraneous instructions and operations can be eliminated.

For example, Maspar Computer Corporation manufactures a MasPar MP-1 SIMD machine and a MasPar-2 SIMD machine consisting of processing elements connected in a two dimensional lattice. The MasPar-2 SIMD machine has an array of 4,096 complementary metal oxide semiconductor (CMOS) processors on four boards with 1,024 processing elements per board. The 4,096 processors are in a 64×64 mesh similar to the mesh or two dimensional array illustrated in FIG. 1A for encoder 40 and the mesh or two dimensional array illustrated in FIG. 2 for encoder 40.

Figure 4:
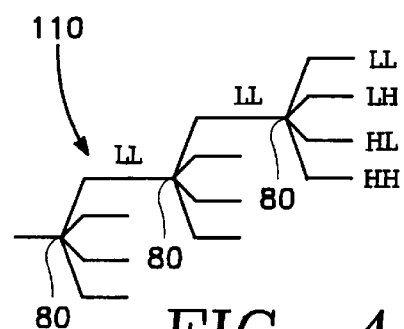
FIG. 4 illustrates a three level wavelet transform which has each node implemented by the 2D wavelet transform of FIG. 3.

Referring to FIGS. 3 and 4, to analyze an image, a separable 2D wavelet transform may be used. A 2D wavelet transform is formed by applying the 4-band multirate filter bank 80 of FIG. 3 first to the image and again to each successive low-low band output of a previous decomposition. This process forms the tree 110 shown in FIG. 4, and it continues until only one sample remains in a final low-low band (for coding applications, successive decomposition is stopped before this point).

In FIG. 3, the blocks labeled $H_0(z)$ and $H_1(z)$ represent the convolution of the input signal with lowpass filters 82, 90 and 98 and highpass filters 84, 92 and 102. Filters 82, and 84 operate first in a vertical direction and then filters 90, 92, 98 and 102 operate in a horizontal direction to form a separable 2D decomposition. The signal is downsampled by a factor of two, as depicted by blocks/circuits 86, 88, 94, 96, 100 and 102, after each filtering operation that is every other sample is discarded. This results in the same number of wavelet coefficients after filtering as there were pixels in the original image.

Figure 5:
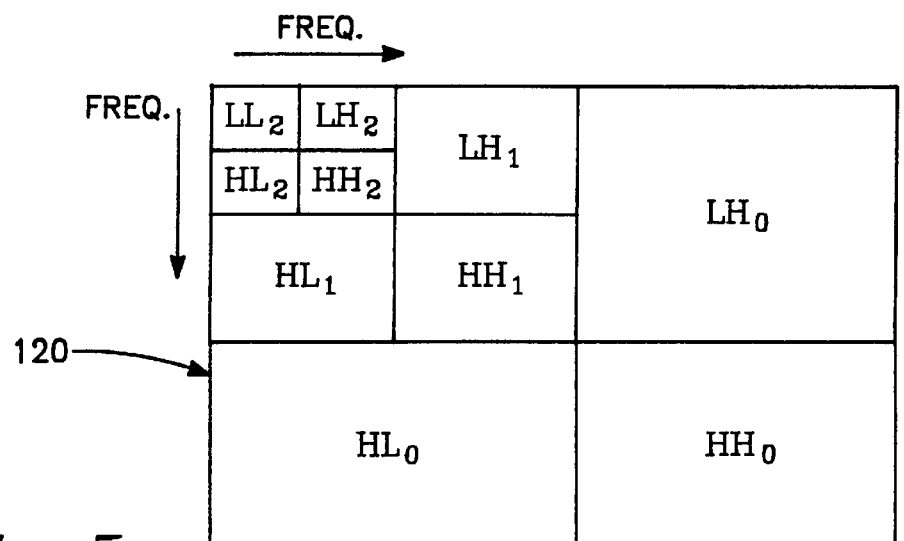
FIG. 5 illustrates the wavelet coefficients for a three level decomposition.
Figure 6:
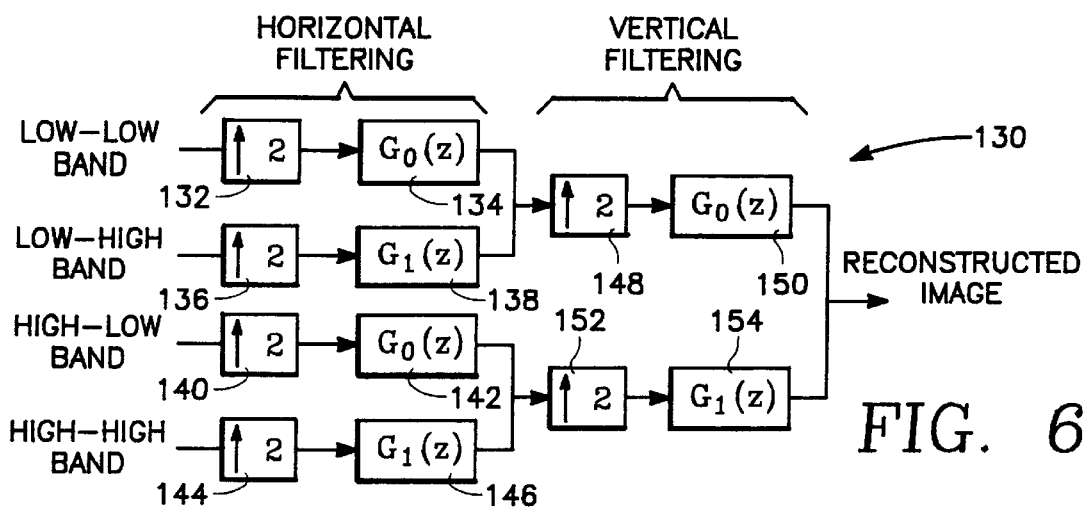
FIG. 6 illustrates one level of an inverse discrete wavelet transform for reconstructing an image.

Referring to FIGS. 5 and 6, there is shown a mapping 120 in FIG. 5 for a 3-level wavelet decomposition which organizes the wavelet coefficients as a succession of subimages. If the filters 82, 84, 90, 92, 98 and 102 in FIG. 3 are chosen correctly, then the original signal can be perfectly reconstructed using successive applications of the 4-band synthesis filter bank 130 shown in FIG. 6.

It should be noted that a five level wavelet decomposition may also be used to organize the wavelet coefficients as a succession of subimages.

Four band synthesis filter bank 130 includes low pass filters 134, 142 and 150; high pass filters 138, 146 and 154 and blocks/circuits 132 136, 140, 144, 148 and 152 which upsample by a factor of two to provide a reconstructed image.

While the system illustrated in FIGS. 3, 4 and 6 works with any basic wavelet or filter bank, the algorithms of the present invention explicitly use the 5/3 biorthogonal wavelet of Daubechies to make the present invention. For the 5/3 biorthogonal wavelet, the filters of FIGS. 3 and 6 have the following filter transfer functions, the lowpass analysis filter is:

$$H_0(z) = -0.125 + 0.25z^{-1} + 0.75z^{-2} + 0.25z^{-3} - 0.125z^{-4}$$

the highpass analysis filter is:

$$H_1(z) = -0.25 + 0.5z^{-1} - 0.25z^{-2}$$

the lowpass synthesis filter is:

$$G_0(z) = 0.25 + 0.5z^{-1} + 0.25z^{-2}$$

and the highpass synthesis filter is:

$$G_1(z) = -0.125 - 0.25z^{-1} + 0.75z^{-2} - 0.25z^{-3} - 0.125z^{-4}$$

Figure 7:
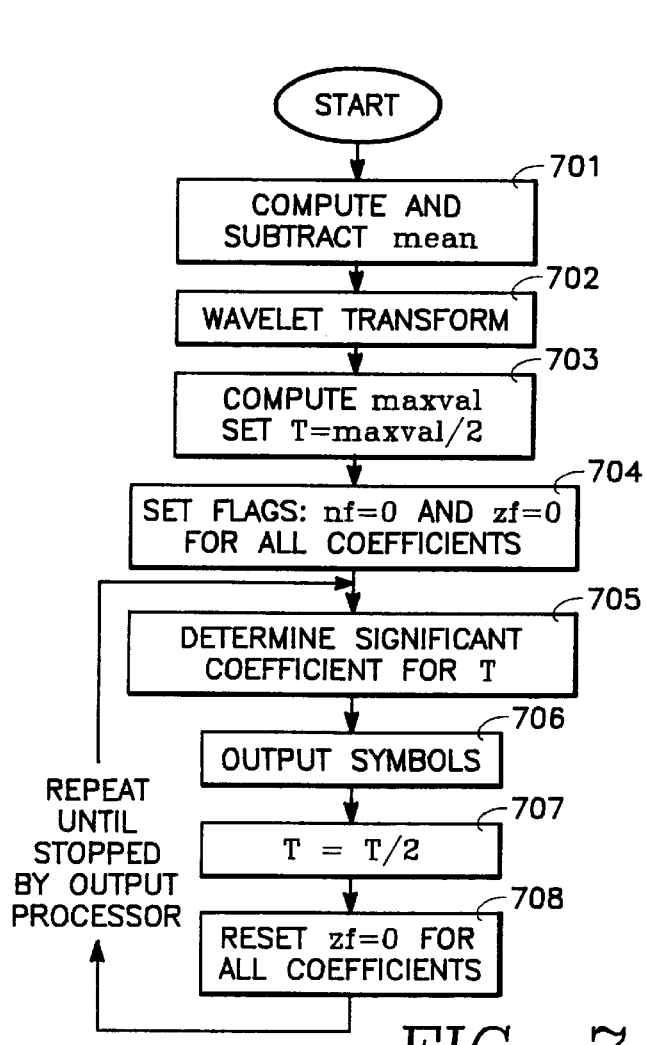
FIG. 7 illustrates a flow chart of the top level algorithm structure of an SIMD processor for the image encoder of FIG. 1A.

Referring to FIGS. 1, 2 and 7, the image encoding algorithm, which converts the image into a compressed bit stream, is divided into two sections: (1) the parallel single instruction multiple data array of processing elements 42 and serial output processor 50. The parallel portion of encoder 40 is described first, the overview of which is shown in FIG. 7. It should be noting that each SIMD processor 46 (FIG. 1B) is executing exactly the same instruction at exactly the same time unless a processor 46 is explicitly blacked out. The scan element 56 and the arithmetic coder 58 which runs in the output processor will then be described.

Unit 701 of FIG. 7 computes the mean of the input image and subtracts the mean computed by unit 701 from the image. Since each processing element 42 of encoder 40 has only a portion of the image pixels, it is necessary to transmit information between processors to compute the global mean of the input image. If the dashed communications paths 44 in FIG. 1 are used which requires a dual-ported memory 52, then the process of computing the mean is accomplished by FIG. 8.

Figure 8:
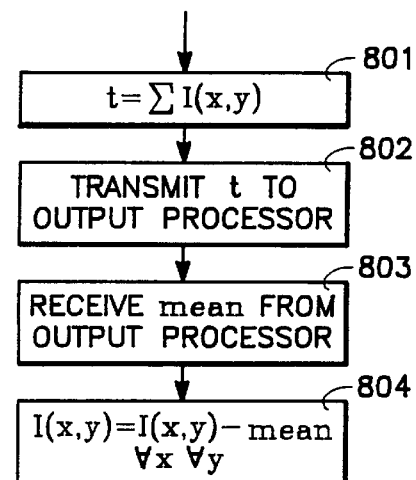
FIG. 8 illustrates a flow chart of a method whereby the mean is computed by the output processor and then subtracted in the SIMD array of the image encoder of FIG. 1A.

Referring to FIG. 8, in FIG. 8, I(x,y) represents the portion of the image contained in a particular processing element 42; thus, each processing element 42 calculates the local sum of all of its image pixels (unit 801), sends this sum to output processor 50 (unit 802), receives the mean from output processor 50 (unit 803) and subtracts from each pixel the global mean received back from output processor (unit 804). Output processor 50 sums all of the partial sums transmitted by the processing elements 42 of encoder 40 and then divides this total by the number of pixels in the image to calculate the global mean.

Referring to FIGS. 1 and 9, when direct communications links to output processor 50 do not exist, the method shown in FIG. 9 is used to compute the global mean on the single instruction multiple data processor array of encoder 40. The method of FIG. 9 assumes that the array size is AX×AY, and it starts by again computing the local sum of the pixels in each processing element 40 (unit 901). The first loop in FIG. 9 which includes units 903, 904, 905 and 906 sums the values from each processor 46 in a right rotation around the mesh interconnections 48 assuming that the mesh interconnections 48 loop around at their boundaries. When the AX rotations are complete, each row of processing elements 42 contains the same partial sums of mean values. The second loop which includes units 907, 908, 909 and 910 performs the same operation in the vertical direction. After this loop is complete, each processing element 42 of encoder 40 contains the sum of all of the pixel values in the image, and the mean is then computed by dividing this sum by the total number of pixels in the image (unit 910).

Referring to FIGS. 1, 7 and 10, in unit 702, a 2D wavelet transform is taken by each processing element 42 of encoder 40 on its block of mean-removed image pixels. FIG. 10 illustrates details of the transform where the 2D wavelet transform is broken down into a succession of two 1D (one dimensional) transforms, each implemented NS times. In FIG. 10, the size of the subimage in the processing element 40 is assumed to be IX by IY, and NS represents the maximum depth of the wavelet decomposition. It should be noted that the disclosed method requires that each processor 46 contain at least one complete zerotree (illustrated in FIG. 17) in each processing element 46 of encoder 40 after the wavelet decomposition is completed.

This implies that the value selected for NS puts requirements on the block sizes IX and IY as well as the processor array size, AX and AY. If the image is of size X by Y, then the user must select $IX \geq 2^{NS}$, $IY \geq 2^{NS}$, $AX \leq X/IX$, and $AY \leq Y/IY$. The subimage sizes, IX and IY, must be powers of 2 to ensure that each processor 46 includes only complete zerotrees with zero-padding being used at image boundaries to compensate if the dimensions of the full image are not powers of 2.

Within the loop of FIG. 10, units 1002 and 1003 filter the image in the vertical and horizontal directions respectively, and these units are further subdivided in FIGS. 11 and 12. Since units 1002 and 1003 are essentially identical with the x and y indices exchanged, the following detailed discussion is with respect to unit 1002.

Referring to FIGS. 1A and 11, in unit 1101 each processor 46 of a processing element 42 sends two quantities labeled t0 and t1 down to the processing element 42 immediately below it in the mesh interconnections 48 of the array of encoder 40.

When a wavelet with longer support than the 5/3 wavelet is used, each processing element 42 must send information not just to the processing element 42 immediately below it but also to the processing element 42 below that one. The number of processing elements 42 that data must be sent is dependent on the support of the wavelet used. For the 5/3 wavelet, t1 is the last element in the current column (indexed by x) and t0 is the second to last element. Transmitting this information overlaps the pixel blocks in each of the processing elements 42.

Figure 15:
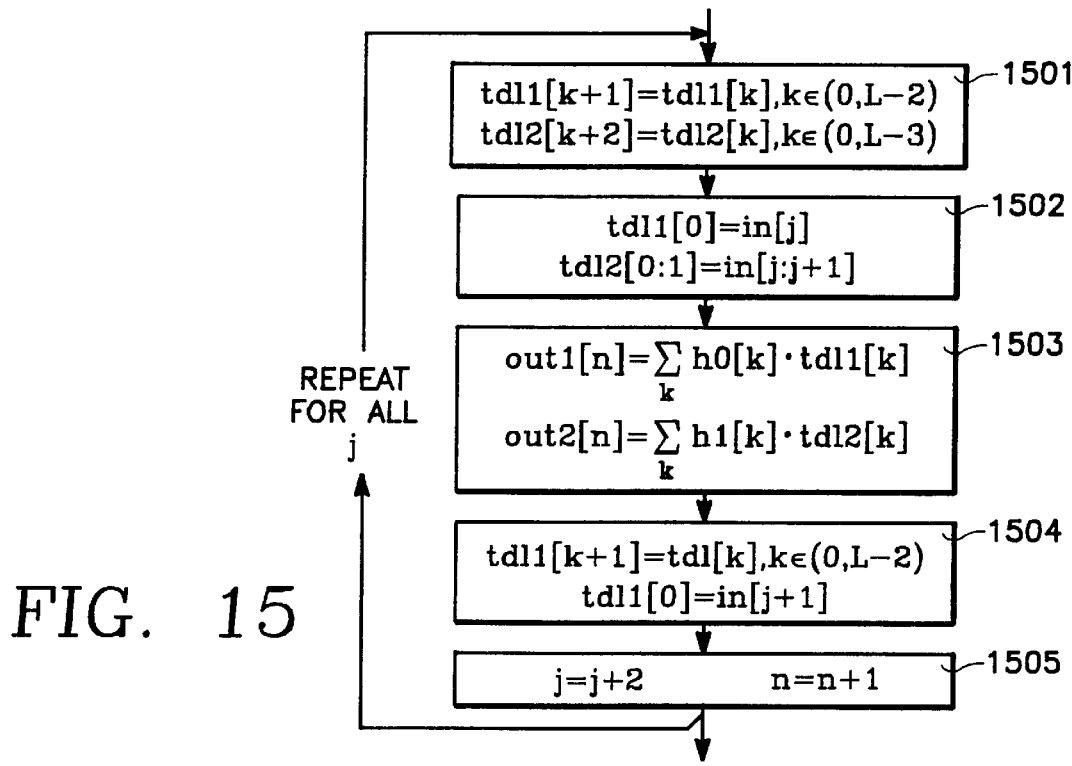
FIG. 15. is a detailed flow chart of the filtering in FIGS. 11 and 12 which includes downsampling by two.

Unit 1102 filters the values of t0 and t1 which a processing element 42 receives from the processing element 42 directly above it in the mesh array of encoder 40. This filtering operation is a standard convolution with h0 (lowpass filtering) and h1 (highpass filtering) followed by a staggered downsampling in which the low and high pass channels are alternately downsampled. FIG. 15. is a detailed flow chart of the filtering in FIG. 11 as well as FIG. 12 which includes downsampling by two.

Since the output of the filter is fed into a dummy variable in Unit 1102, the operation is equivalent to loading tapped delay lines used by filters with the input values t0 & t1. The asterisks in units 1102, 1103, 1106 and 1107 are used to indicate that some processing elements must be blacked out or shut down while that unit is operating. In the case of Unit 1102, only those processing elements 42 along the upper edge of the array of encoder 40 containing the upper edge of the image must be blacked out. Unit 1103 operates only in the processing elements 42 along the upper edge of the image implementing symmetric extension to eliminate edge transients.

The horizontal filtering in FIG. 12 is similar to the vertical filtering in FIG. 11 with unit 1202 blacked out only for processing elements 42 along the left edge of the array of encoder 40 and unit 1203 blacked out for all processing elements 42 of the array of encoder 42 except the processing elements 42 along the left edge of the array of encoder 42.

Unit 1104 filters the column of the image indexed by x with the highpass and lowpass filtering operations depicted in FIG. 3. The colon is used to indicate that the entire column of row x in data array I(x,y) is filtered. In unit 1104, v0 and v1 each have columns with half the length of the original I(x,y). Unit 1105 sends two quantities labeled t0 and t1 up to the processor 46 directly above this one in the mesh interconnections 48 of encoder 40. These quantities are the first and second elements in the current column of the data array I(x,y). As before, if longer wavelets are used, then more elements of I(x,y) must be sent to processors 46 further up in the array of encoder 40.

Unit 1106 computes the last elements of v0 and v1 in all processing except those along the bottom row of the image. The last elements in the output vectors for the processing elements 42 of encoder 40 along the bottom row are computed by Unit 1107 using symmetric extension. Finally, Unit 1108 stores the outputs of the multirate filtering operations back into the original data array, I(x,y). Successive processing in the vertical and horizontal directions in this manner results in I(x,y) for each processing element 42 of encoder 40 containing the wavelet coefficient mapping shown in FIG. 5.

It should be noted that only a few operations are blacked out in FIGS. 11 and 12. In addition it should be noted that only 4 coefficients in each pass need be transmitted and only to adjacent processors 46 within encoder 40.

Referring to FIG. 12, units 1206 and 1207 in FIG. 12 are completely analogous to units 1106 and 1107 in FIG. 11 with the right column substituted for the bottom row in the description.

Referring to FIGS. 1 and 7, the data array I(x,y) within each processor 46 of encoder 40 now contains the wavelet coefficients organized as shown in FIG. 5. Unit 703 determines the largest of these coefficients (identifying the coefficient as maxval) and sets the threshold T=maxval/2.

Figure 14:
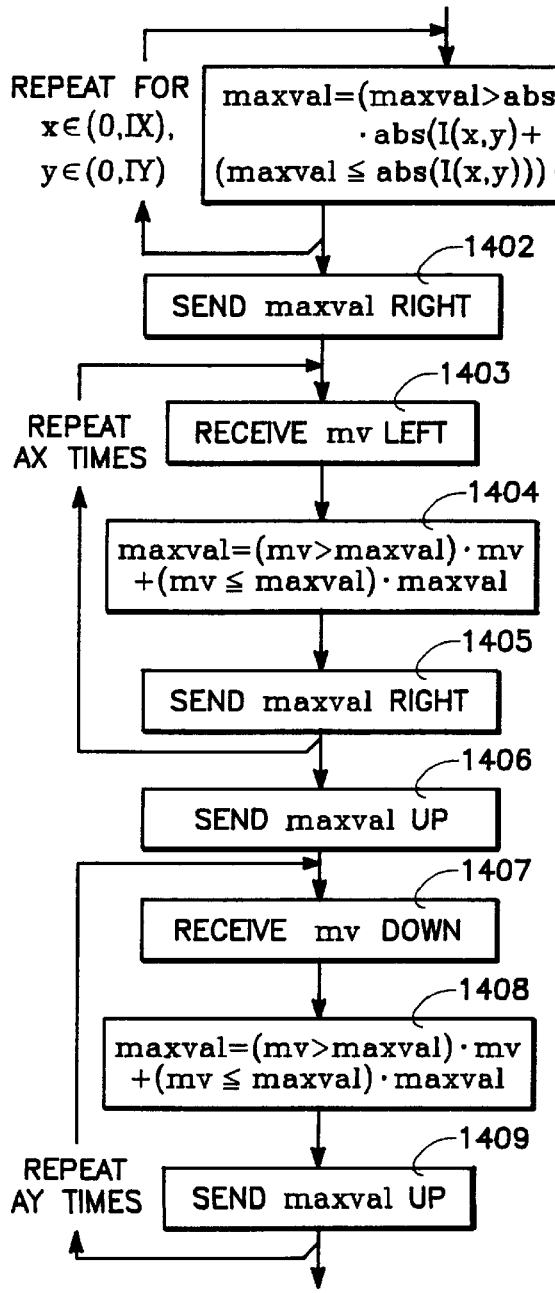
FIG. 14 illustrates a flow chart of a method for computing the maximum wavelet coefficient using the SIMD array of the image encoder of FIG. 1A.

Referring to FIGS. 1, 7, 13 and 14, the flow charts of FIGS. 13 and 14 illustrate two ways in which unit 703 can be constructed depending on the communications links available. The flow chart of FIG. 13 assumes that the dashed communications links 44 in FIG. 1A exist and uses the output processor 50 to assist it. Within each processing element 42 of encoder 40, maxval is calculated by unit 1301 and transmitted to output processor 50 by unit 1302. The output processor 50 simply computes the largest of all of the values sent to it and broadcasts that back to the processing elements 42 of encoder 40 (Unit 1303).

In FIG. 14, maxval is calculated without the aid of the output processor 50. First, the local maxval is calculated within each processing element 42 of encoder 40 by unit 1401 and sent right along interconnections 48 of the array of encoder 40 (unit 1402). The process of units 1403, 1404 and 1405 repeats itself AX times (where AX is the number of processing elements 42 in the x direction) with each processing element 42 keeping the largest value (unit 1404). After the loop of units 1403, 1404 and 1405 is complete, each processing element 42 will contain the largest wavelet coefficient of any along its row. The process is then repeated in the vertical direction (units 1407, 1408 and 1409) resulting in each processing element 42 containing the global maxval for the array of encoder 40.

Unit 704 initializes the flags nf and zf setting the flags to zero. Every wavelet coefficient in data array I(x,y) has these flags associated with it. Unit 705 determines which coefficients are significant for the current value of T and performs the initial step needed to calculate the zerotrees. The symbol corresponding to a given wavelet coefficient is determined to be a zerotree root if it and all of its descendants but not its parent have a magnitude which is less than the current value of T.

Figure 17:
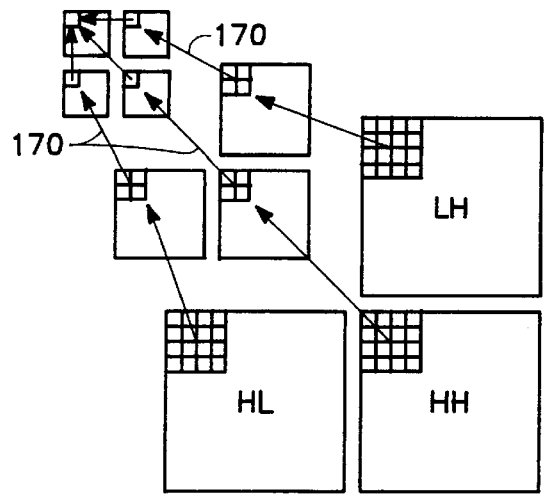
FIG. 17 is a flow diagram illustrating the zerotree relationship between wavelet coefficients in different bands within a processing element of the image encoder of FIG. 1.

Referring to FIG. 17, FIG. 17 illustrates the parent/child relationships for one complete zerotree with arrows 170 identifying parent pointers. It should be noted that a zerotree root can occur at any node (wavelet coefficient) within the quadtree structure and that no coefficient symbols below a zerotree root need be transmitted to the receiver.

Figure 18:
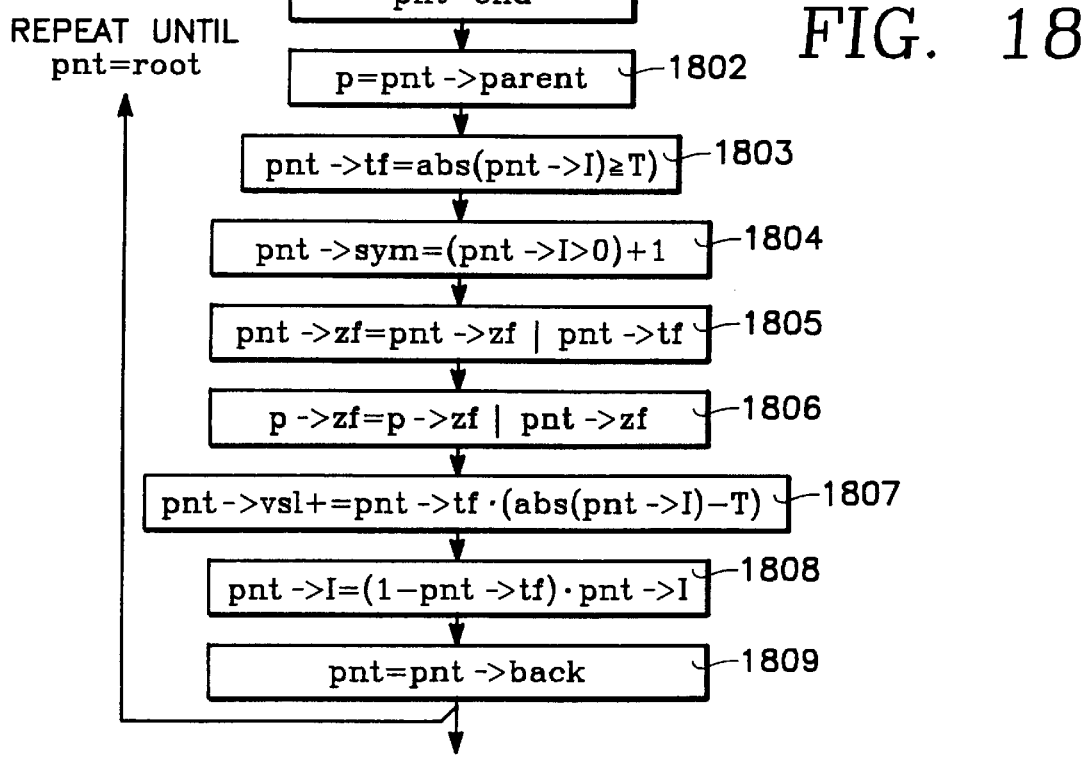
FIG. 18 is a detailed flow chart of unit 705 of FIG. 7 for determining which wavelet coefficients are significant for a current value of a threshold T.
Figure 16:
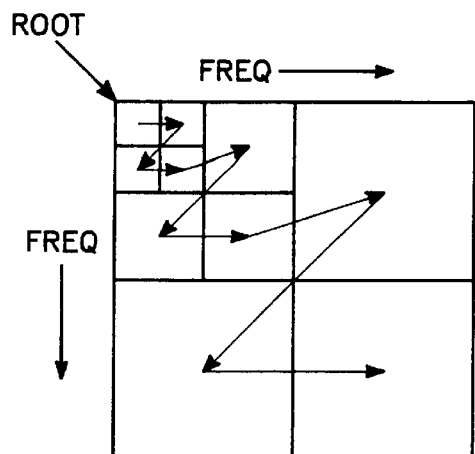
FIG. 16 is a flow diagram illustrating the coefficient scanning order within each processing element of the image encoder of FIG. 1.

Referring to FIGS. 7, 16, 17 and 18, unit 705 is broken down further in FIG. 18. The notation used in the units of FIG. 18 is standard C language notation for dealing with linked list data structures and is as follows: the symbol -> accesses the value of the given quantity, such as flag zf, which corresponds to the current pointer address which is the label to the left of ->. The order in which the wavelet sub-bands are scanned is shown in FIG. 16 with root pointing to the first coefficient in the scan and end pointing to the last coefficient in the scan. Within each sub-band coefficients are scanned in a raster fashion from the upper left corner of data array I(x,y) to the lower right corner of data array I(x,y). The parent links are defined in FIG. 17 where multiple children link to a single parent. The back link used in FIG. 18 which is ->back indicates movement backward along the scanning path shown in FIG. 16.

Referring now to FIG. 18, unit 1801 initializes the wavelet coefficient pointer pnt to point to the last coefficient in the scanning list. Unit 1802 sets a temporary pointer p equal to the parent of pnt. Next, unit 1803 sets the tf flag for the current wavelet coefficient (which is accessed by pnt->I) equal to 1 if the coefficient's magnitude is greater than T. The symbol for the wavelet coefficient (which is pnt->sym) is set to 2 if the coefficient is positive and 1 if it is negative (Unit 1804). Unit 1805 sets the zf flag associated with the coefficient to itself OR'd with its tf flag with the single vertical bar indicating a bit wise OR operation. Unit 1806 sets the zf flag of the parent of the current coefficient to itself OR'd with the zf flag of the current coefficient. Unit 1807 effectively sets a quantity labeled vsl associated with each wavelet coefficient to the difference between the magnitude of the coefficient and T when tf=1 with the notation += implying that the quantity on the right-hand side is added to the quantity on the left-hand side. The effect of Unit 1808 is to zero out the current wavelet coefficient if tf=1 to ensures that tf will never equal 1 on future scanning passes for the coefficient. The coefficient is now classified as significant. Unit 1809 takes one step backward through the array of wavelet coefficients, and the process is repeated until root is reached as defined in FIG. 16. Since every processing element 42 has exactly the same number of wavelet coefficients, this loop terminates at the exactly same time in each processing element 42.

Figure 19:
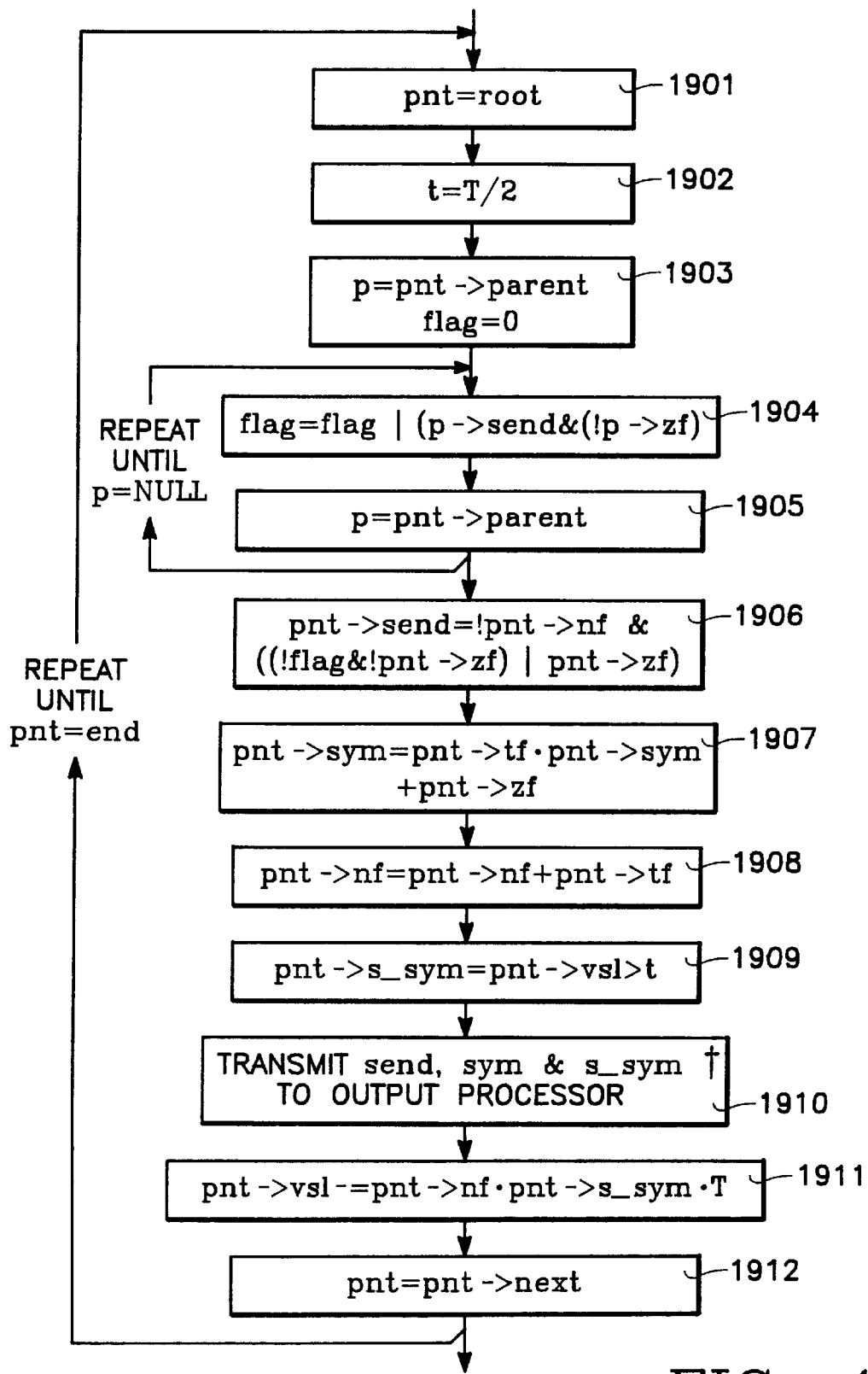
FIG. 19 is a detailed flow chart of unit 706 of FIG. 7 which creates the symbols which are arithmetically encoded by the output processor of FIG. 1A.

Referring to FIGS. 1, 7 and 19, unit 706 creates the symbols which are supplied to and arithmetically encoded by the output processor. Unit 706 is broken down in FIG. 19. Unit 1901 of FIG. 19 initializes the scan to start at the root. Next, a temporary variable t is set equal to half the current threshold T (unit 1902). Unit 1903 zeros variable flag and sets pointer p equal to the parent of the current wavelet coefficient which is pointed to by pnt. Unit 1904 sets flag if either flag is already set or if the send flag of p is set and the zf flag of p is not set. Pointer p is then incremented to the next parent by unit 1905 and the loop containing units 1904 and 1905 repeats until the final ancestor is reached. This loop terminates at exactly the same time for every processing element 42 of encoder 40. Unit 1906 sets the send flag associated with the current coefficient equal to 1 if the current coefficient's nf flag equals 0 and either the current coefficient's zf flag equals 1 or the combination of flag=0 and zf=0 is true. If the send flag for a wavelet coefficient is set, then the symbol which corresponds to the send flag must be sent to the output processor 50 during the current pass for encoding and transmission to the image decoder 60.

At this time should be noted that a pass may be a dominant pass if the coefficient has not yet been determined to be significant and a subordinate pass if the coefficient has not yet been determined to be significant. This results in a dominant list containing entries of evaluated coefficients that have not as yet been identified as significant at previous coarse threshold values and a subordinate list containing entries of evaluated coefficients that have been identified as significant at previous coarse threshold values.

Unit 1907 modifies the symbol sym transmitted to output processor 50. The symbol sym is set forth as follows: sym=3 implies that the wavelet coefficient is positive significant; sym=2 implies that the wavelet coefficient is negative significant; sym=1 implies that the wavelet coefficient is an isolated zero and sym=0 implies that the wavelet coefficient is a zerotree root. Unit 1908 sets the nf flag for current coefficient equal to the sum of itself and its tf flag. Once the nf flag is set, the coefficient is known to be significant. In Unit 1909, s_sym which is the subordinate symbol is set to 1 if vsl>t. Unit 1910 transmits send, sym, and s_sym for the current wavelet coefficient to output processor 50. The dagger symbol in unit 1910 indicates that this may not be an explicit operation, that is when the processing element 42 has the dual-ported memory 52 connected thereto (FIG. 1B), then output processor 50 can simply read these values directly from dual ported memory 52. Next, unit 1911 sets vsl equal to itself minus t multiplied by nf and s_sym for the current wavelet coefficient. Finally, the pointer is incremented by Unit 1912 to point to the next wavelet coefficient in the scanning order and the process is repeated until the end of the scan is reached. Since each processing element 42 of encoder 40 has the same number of wavelet coefficients, the end will be reached simultaneously for all of the processing elements 42 of encoder 40.

Referring again to FIGS. 1A and 7, unit 707 divides the current threshold T by 2 while unit 708 resets the zf flags associated with all of the wavelet coefficients. The loop containing Units 705 through 708 is repeated until stopped by output processor 50. If a fixed bit rate output is desired, output processor 50 tracks the total number of bits transmitted to the receiver for image decoder 60 and stops all of the processing elements 42 of encoder 40 when the desired number if reached. If a fixed image quality is desired, output processor 50 must keep track of the error between each wavelet coefficient and the approximation of it which has been transmitted to decoder 60.

Referring now to FIGS. 1A, 21, 22, 23, 24, 25 and 26, the final step required to completely describe the image encoding algorithm is to describe the functions of output processor 50. The operation of output processor 50 is described in FIG. 21 with detailed functional breakdowns given by FIGS. 22 through 26. Unit 2101 accepts the local sums and maxvals from the processing elements 42, computes the global mean and maxval, and broadcasts these values back to the array of encoder 40. The global mean is computed by adding up all of the local sums and dividing by the number of pixel elements while the global maxval is computed by taking the largest of all of the local maxvals. When the methods of FIGS. 9 and 14 are used to directly compute the global mean and maxval, then Unit 2101 is removed from the flow chart of FIG. 21A.

Figure 22:
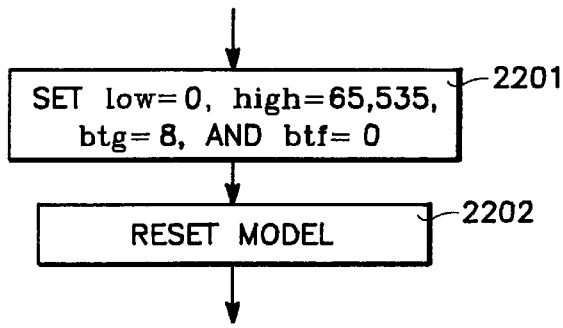
FIG. 22 is a flow chart for initilizing the arithmetic coder of unit 2102 of FIG. 21.

Unit 2102 initializes the arithmetic coder 58 for 16 bit integer arithmetic and a 4 symbol input alphabet which is detailed in FIG. 22. Unit 2103 inputs send which is a binary value and sym which is a 2 bit number indicating one of 4 possible symbols from the processing element array of encoder 40 in the order defined by FIG. 20.

Figure 20:
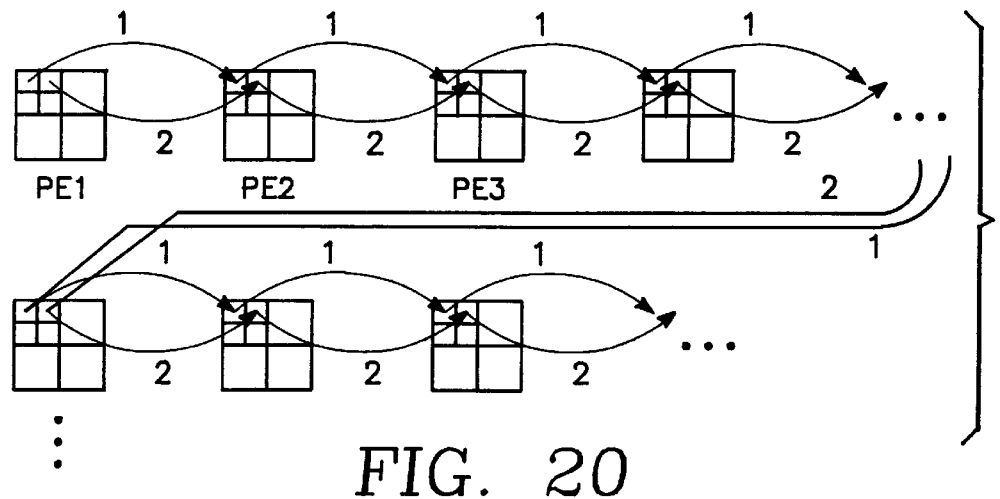
FIG. 20 is a flow diagram depicting the output processor symbol scan.

In FIG. 20, the numbered arrows indicate the pass which is pass 1 or pass 2. First, the lowest frequency band of the first processing element 42 is scanned, followed by the same band of second processing element 42 until all of the processing elements 42 of the array of encoder 40 have been scanned which is pass 1 in FIG. 20. Next, the band to the right of the low-low band is scanned in each processing element 42, which is pass two in FIG. 20, followed by the band under the low-low band. This process continues with the next band to be scanned selected according to FIG. 16 until all bands of all of the processors 46 of encoder 40 have been scanned.

It should be noted that any scanning order can be used in encoder 40 as long as the same order is also used in image decoder 60, but the best scanning order is the one which maximizes the correlation between adjacent symbols in the scan. Scanning in this manner, in turn, maximizes the efficiency of the arithmetic coder 58 and results in the optimal rate-distortion performance.

Figure 25:
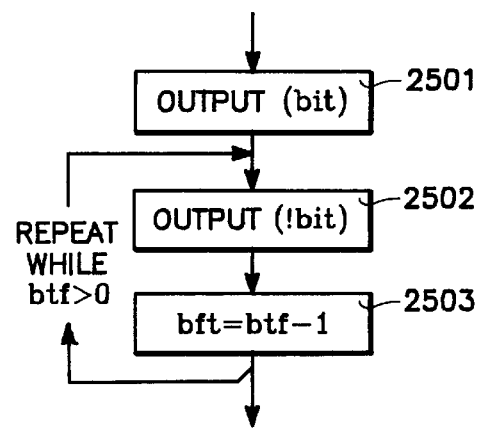
FIG. 25 is a detailed flow chart for units 2405, 2407 and 2409 of FIG. 24.

Unit 2104 checks to see if send is equal to one. If send is not equal to one, the scan is incremented to the next symbol in the list and the test is repeated. If send=1, then unit 2105 determines the index corresponding to sym and places it in tsym. This index is then arithmetically encoded by Unit 2106 using internally a quantity labeled cum_freq (cumulative frequency) which tracks the relative probability of occurrence of the different symbols. Unit 2106 is broken down in more detail by FIG. 24. Unit 2107 updates the adaptive source model used by encoder 40 and is further broken down in FIG. 26. This model tracks the occurrences of all of the symbols and uses this as an estimate of the probability of the next symbol. Next, the variable sig is set to 1 by unit 2108 if sym is equal to 2 or 3, indicating to the output processor 50 that the wavelet coefficient corresponding to sym is now significant. Output processor 50 stores a value of sig for each coefficient in the scan list. Unit 2109 checks to see if bit_cnt equals or exceeds bit_total which is the total number of bits available for the compressed image. Bit_cnt is the count of the bits output from encoder 40 which is incremented by one every time output( ) in FIG. 25 is called.

Figure 23:
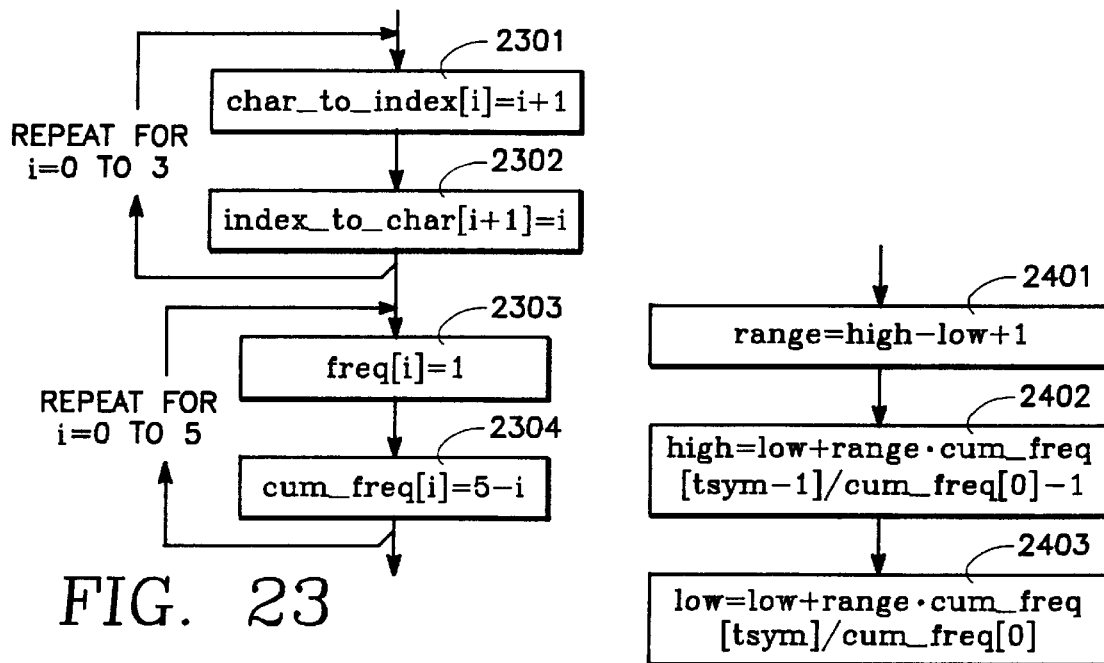
FIG. 23 is a detailed flow chart for the reset model used in FIGS. 21 and 32.
Figure 24:
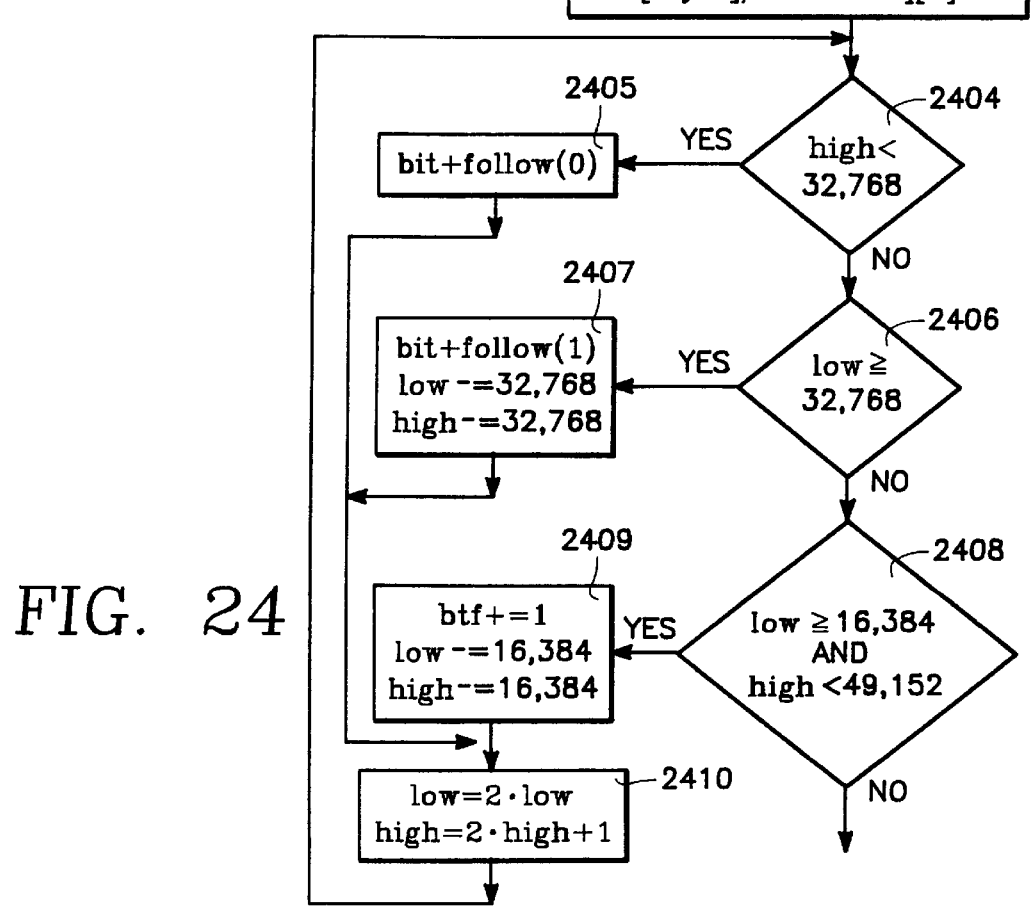
FIG. 24 is a detailed flow chart for the encode symbol used in FIG. 21.
Figure 26:
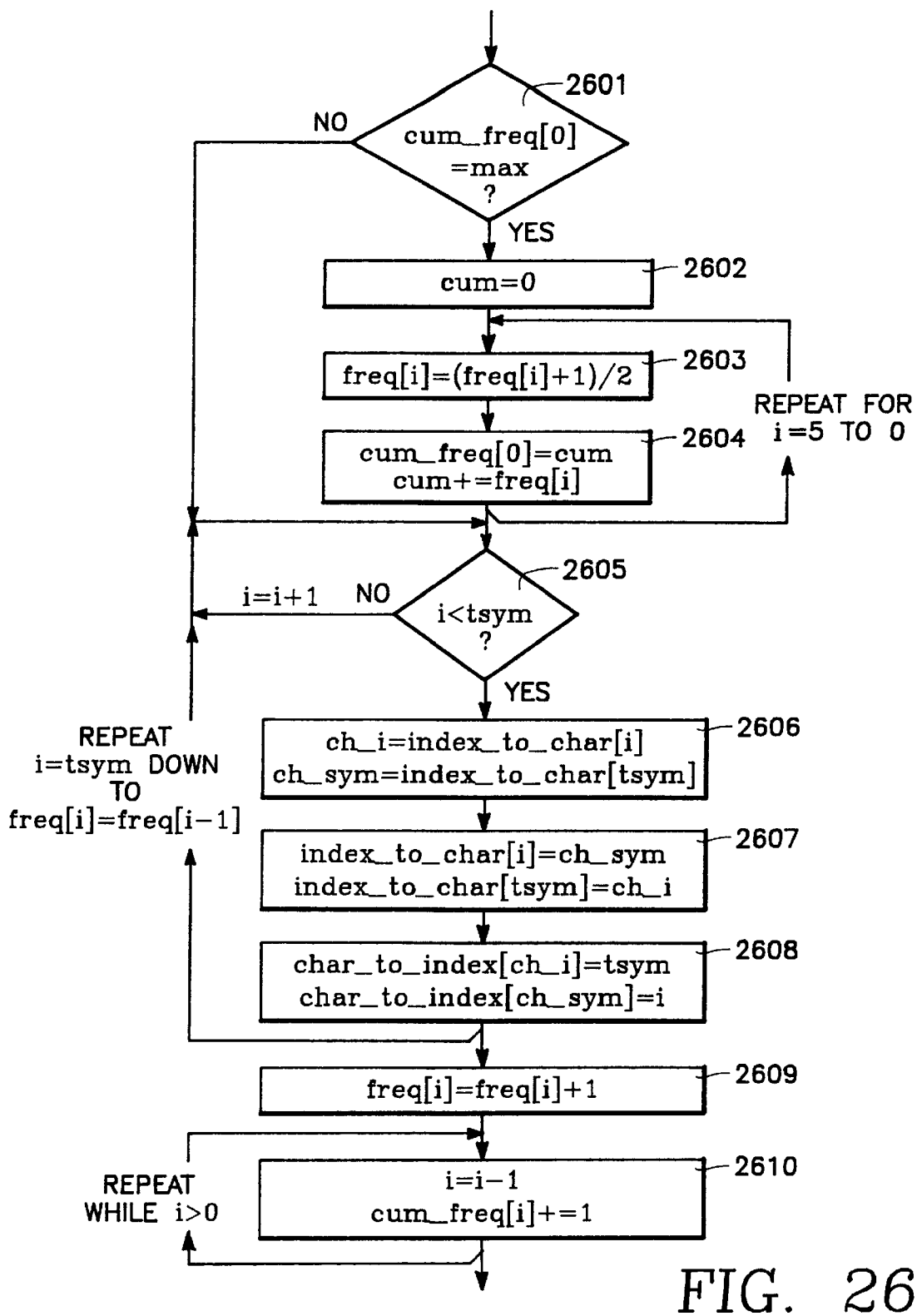
FIG. 26 is a detailed flow chart for update_model(tsym) used in FIGS. 21 and 22.

If the answer is "yes", the output processor 50 broadcasts a stop command to all of the processing elements 42 of encoder 40 and then stops itself. If the answer is "no", the loop is repeated until the symbol scan described by FIG. 20 is complete, after which the encoding continues with Unit 2110. The purpose of unit 2110, whose functions are further broken down in FIG. 23, is to reset the symbol probabilities to equality, for example, every symbol will have an equal probability of occurrence. Next, the symbol scan is reset and variable tog is set equal to 0 by Unit 2111.

Figure 21A:
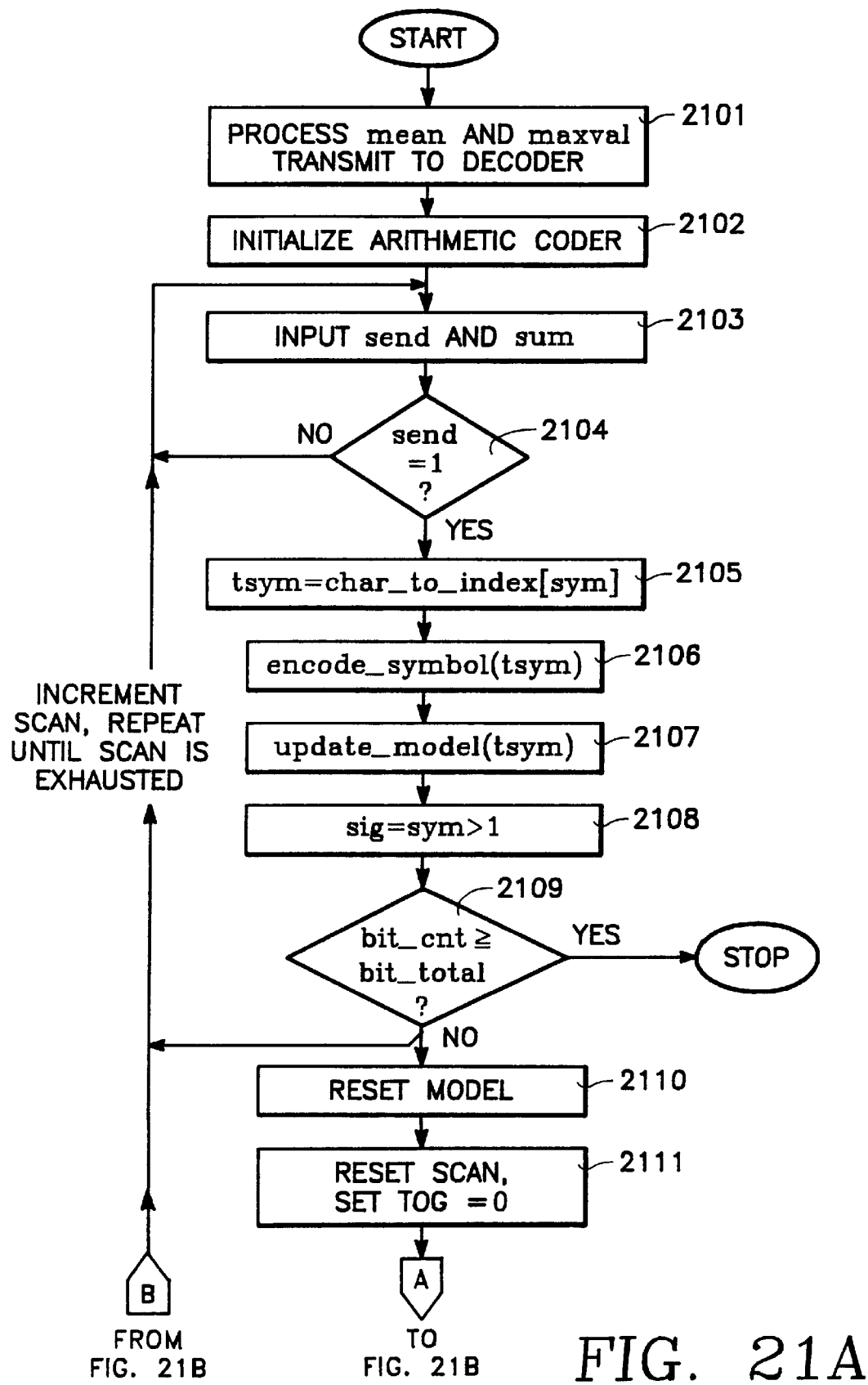
FIGS. 21A and 21B is a flow chart for the output processor program.
Figure 21B:
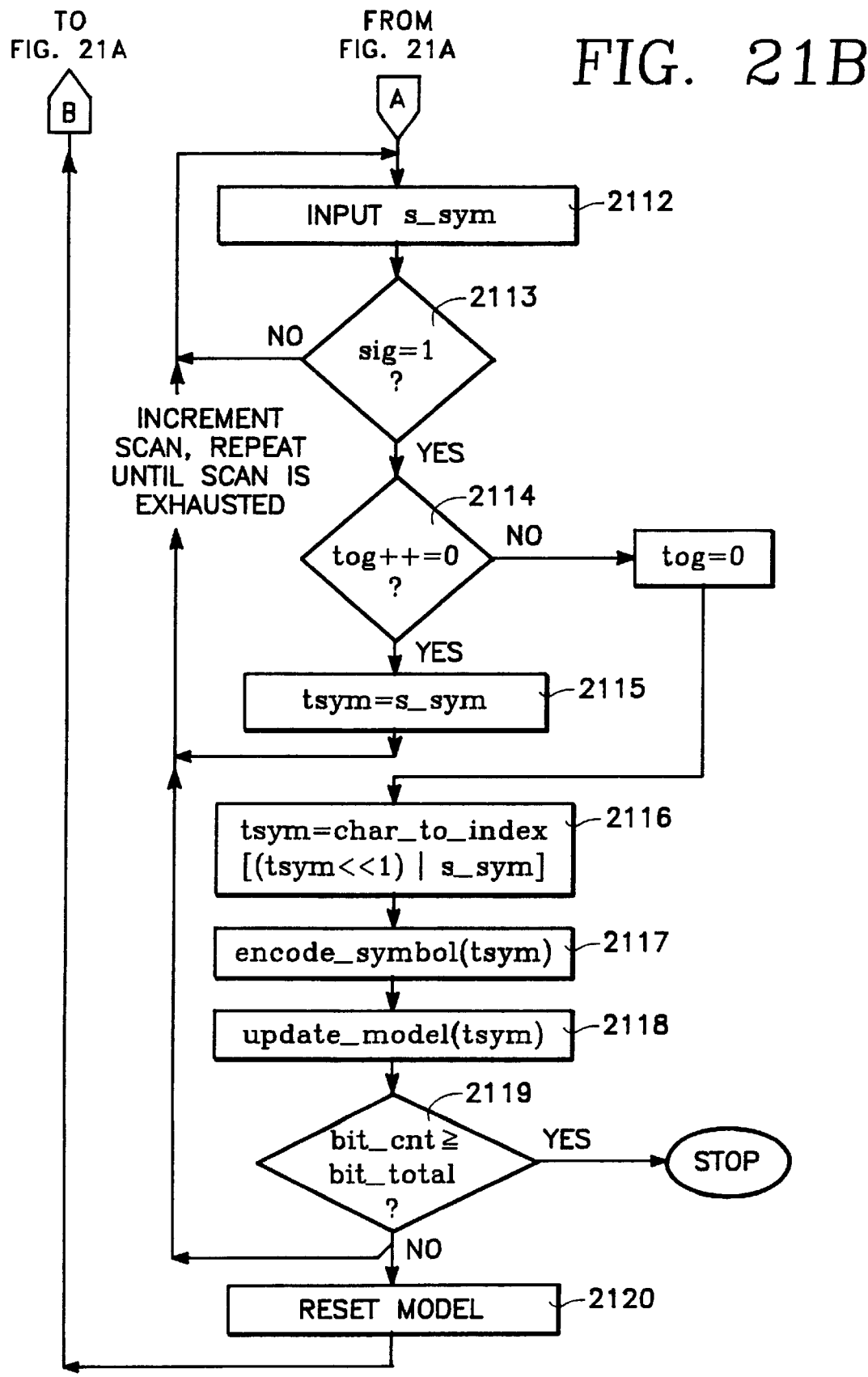

Referring to FIG. 21B, s_sym is input by unit 2112. Again, this is done according to the scanning order defined by FIG. 20, and it is equivalent to a memory fetch if a dual port memory 52 is used. Unit 2113 checks to see if sig=1 for the current wavelet coefficient and, if not, the scan is incremented and the next s_sym is read. Unit 2114 checks to see if tog=0 and then incrementing it after the test. If the answer is "yes", tsym is set equal to s_sym and the loop repeats. If the answer is "no", tog is reset to zero and tsym is set equal to the index of s_sym OR'd with tsym shifted left by 1 bit position (Unit 2116). The purpose of this operation is to concatenate two 1 bit symbols into one 2 bit symbol for input to the arithmetic coder 58. Unit 2117 arithmetically encodes tsym as detailed in FIG. 24 using again the cumulative symbol frequency, cum_freq. Next, unit 2118 updates the source model of FIG. 26, and unit 2119 tests to see if the bit count has exceeded the number of bits available for coding that image. If the answer is "yes", a stop command is broadcast to the processing elements 42 of encoder 40 and execution by the output processor 50 is terminated. If the answer is "no", the scan loop is repeated until the symbols associated with all of the wavelet coefficients have been scanned. Once the scan is complete, unit 2120 is executed to reset the model (FIG. 23). and the output processor 50 begins accepting symbols from the processing elements 42 of encoder 40 corresponding to the next pass through the wavelet coefficients with the threshold being halved.

Figure 27:
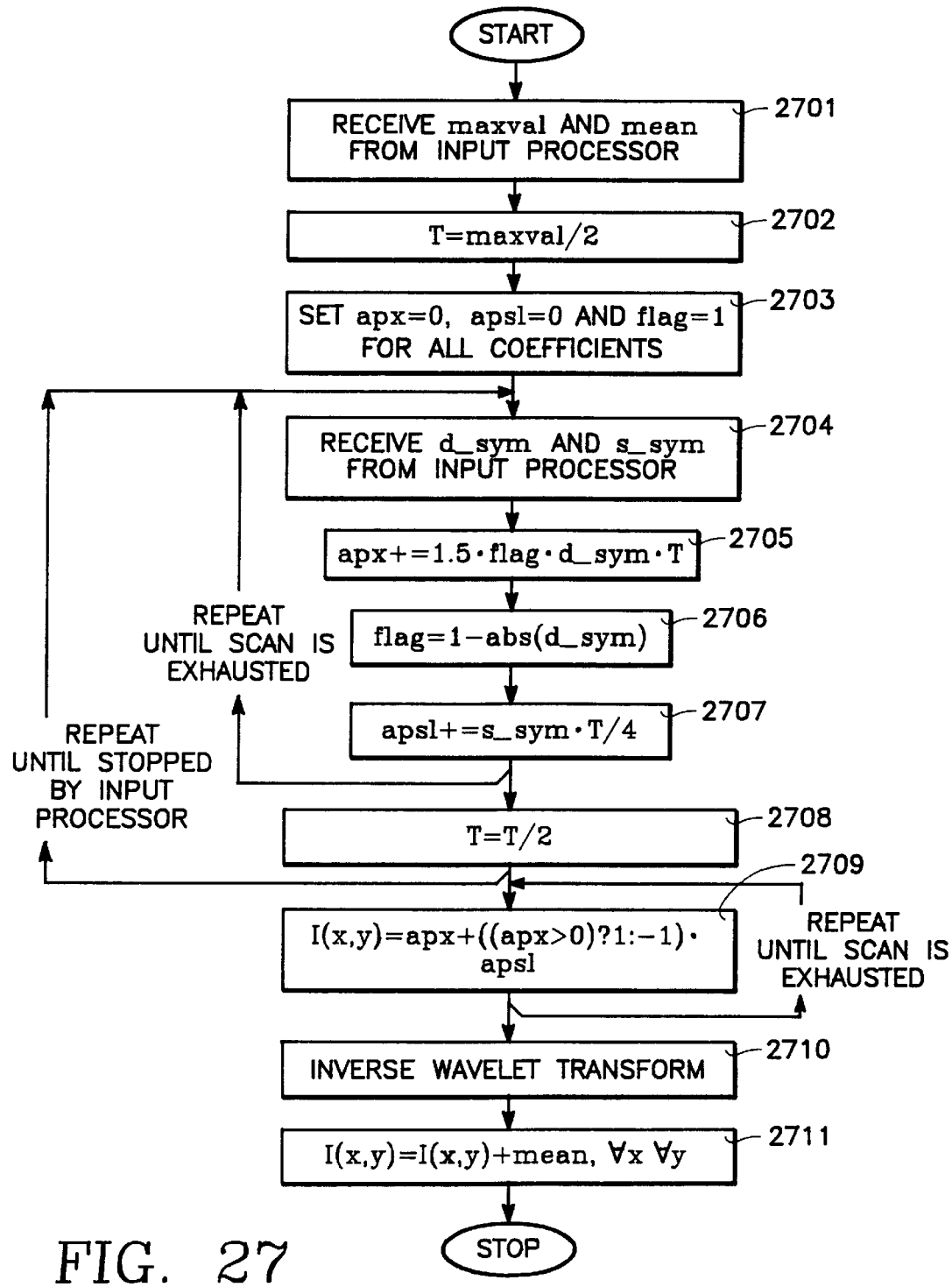
FIG. 27 is a flow chart for the SIMD processing elements of the image decoder of FIG. 2.

Referring now to FIGS. 2 and 27, an overview of the operation of the individual SIMD processing elements 62 of decoder 60 is shown in FIG. 27, which corresponds to the hardware configuration of FIG. 2. First, Unit 2701 receives the image mean and the maximum wavelet coefficient value (maxval) from the input processor. Unit 2702 then sets the starting threshold T equal to maxval divided by 2 which is rounded up to the nearest integer, if necessary. Next, Unit 2703 sets the variables apx=0 (the approximation based on the significance map), apsl=0 (the apxroximation based on the resolution increases), and flag=1 for each wavelet coefficient to be reconstructed. Unit 2704 receives values of d_sym (significance map) and s_sym (resolution increase) from the input processor 70, following the scanning order given by FIG. 16 starting from root. Unit 2705 updates the approximation of the current wavelet coefficient in the scan if flag equals 1 and d_sym is not equal to zero.

It should be noted that d_sym takes on a value of +1 if the coefficient on the pass is positive significant, −1 if the coefficient is negative significant, or zero.

Once a coefficient has been found to be significant, unit 2706 sets the coefficient's flag to 0, preventing further updates of apx. Unit 2707 reduces the approximation error of the wavelet coefficient using the resolution increase for the current pass. If the coefficient has not yet been determined to be significant, s_sym will have a value of 0. After Unit 2707, the scan is incremented and the inner loop is repeated until end in FIG. 16 is reached.

Unit 2708 halves the threshold, and the outer loop is repeated until stopped by input processor 70. Next, unit 2709 forms the approximated wavelet coefficients in array I(x,y) using the sum of apx and apsl for each coefficient. The parenthetical statement in Unit 2709 is standard C language syntax, and it indicates that apsl should be added to apx if apx is positive and subtracted from apx if it is negative.

Following this loop, unit 2710 performs a 2D inverse wavelet transform on the approximated coefficients and places the result back into the data array I(x,y). Finally, unit 2711 adds the mean value back on to the image, and the decoding process is complete with one block of image pixels residing in each processing element 62 of decoder 60.

Figure 28:
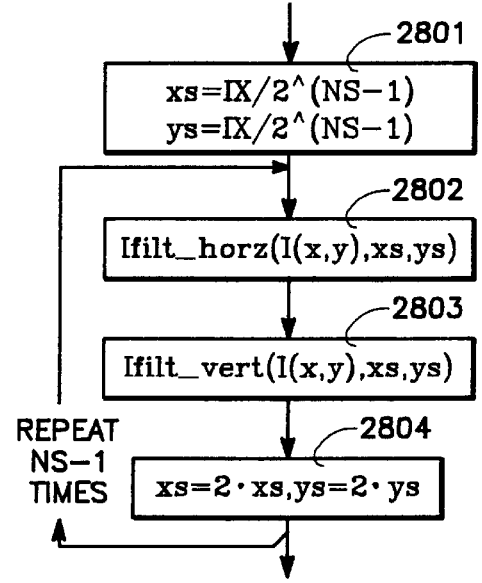
FIG. 28 is a flow chart for a two dimensional wavelet transform of depth NS.

Referring to FIGS. 2, 27 and 28, unit 2710 is broken down in FIG. 28. Unit 2801 initializes xs and ys given that IX and IY are the x and y dimensions of the block of image pixels and the size of the corresponding wavelet coefficient map in a processing element 62 of decoder 60 and NS is equal to the number of wavelet scales. There is a requirement that xs and ys must be greater than or equal to 2 initially.

Unit 2802 performs a 1D inverse wavelet transform in the horizontal direction, while unit 2803 performs the same operation in the vertical direction. Variables xs and ys are then doubled in unit 2804 and the process is repeated NS−1 times, that is units 2802 through 2804 are executed a total of NS times.

Figure 29:
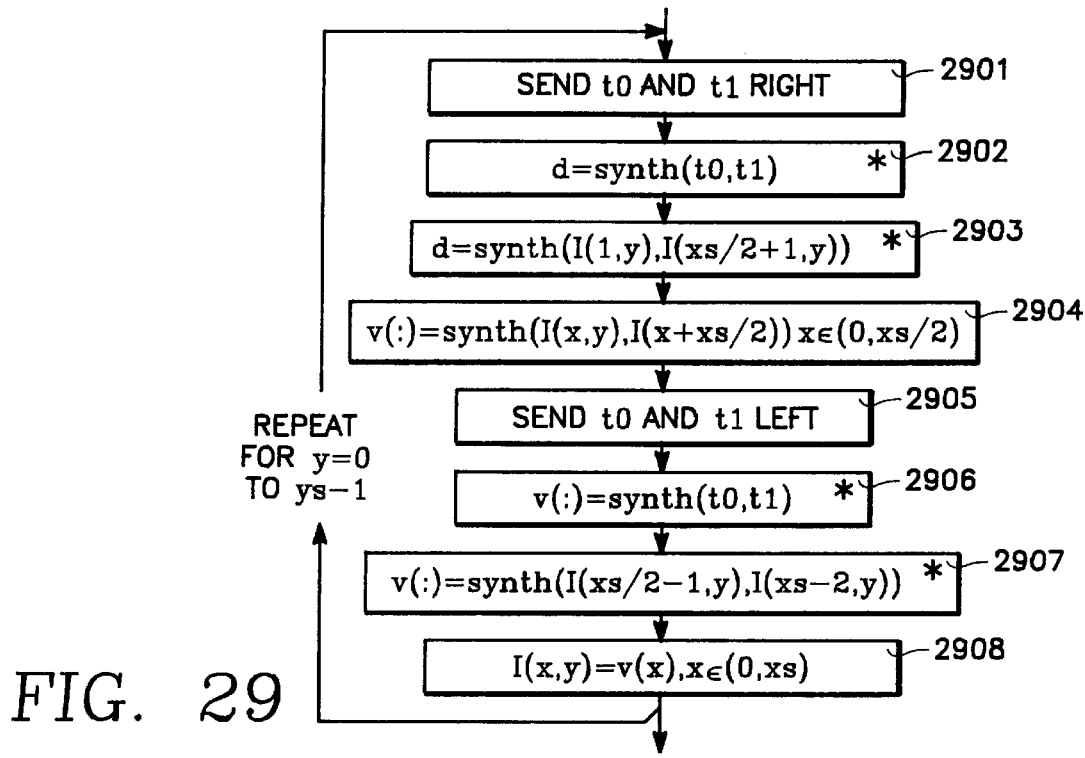
FIG. 29 is a detailed flow chart of unit 2802 of FIG. 28.
Figure 30:
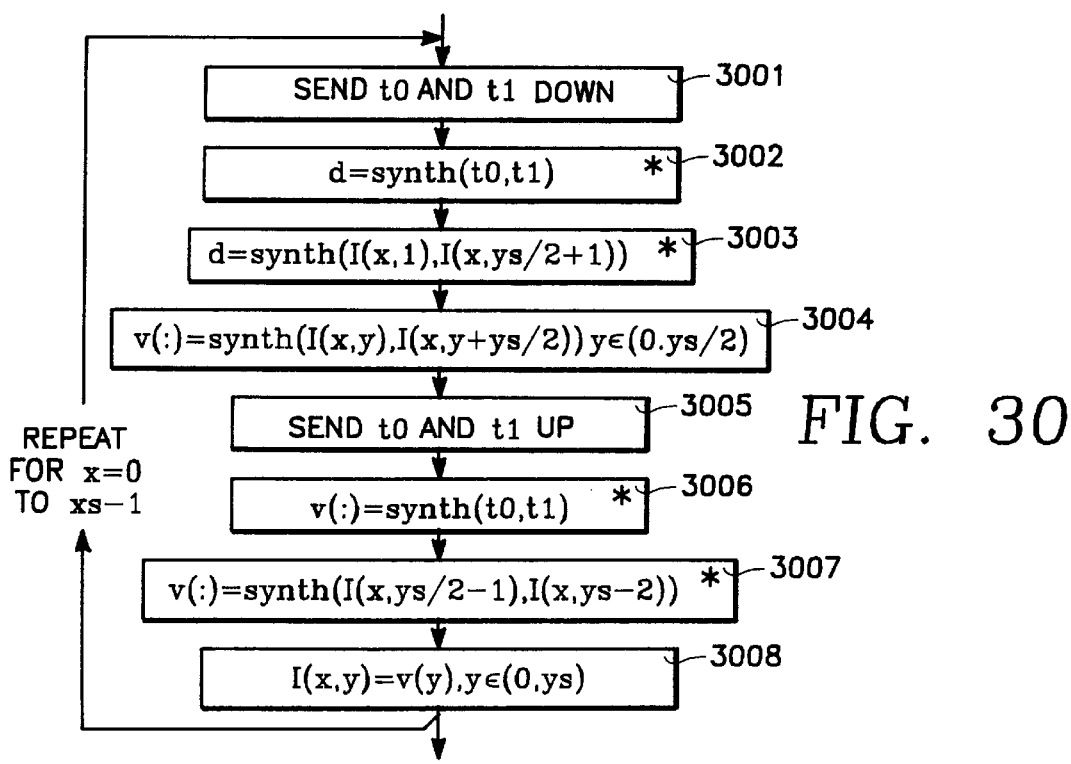
FIG. 30 is a detailed flow chart of unit 2803 of FIG. 28.

Referring to FIGS. 2, 28, 29, 30 and 31, units 2802 and 2803 are described in detail by FIGS. 29 and 30, respectively. Since these are essentially identical with a swap of indices, the following discussion is with respect to only the operation of FIG. 29. Unit 2901 sends the last value of each of the two lowest frequency horizontal sub-bands in the current line (accessed by index y) of I(x,y) to the processing element 62 to its right as t0 and t1. The values of t0 and t1 received by this processing element 62 are then passed through the synthesis operation by unit 2902 for all processing elements 62 of decoder 60 except the processing elements 62 along the left edge of the array of decoder 60. The processing elements 62 not affected by unit 2902 are instead processed by Unit 2903 in order to implement symmetric extension mirroring each sub-band about its first point.

It should be noted that the outputs of both units 2902 and 2903 are discarded. The purpose of these routines is to initialize filters.

Figure 31:
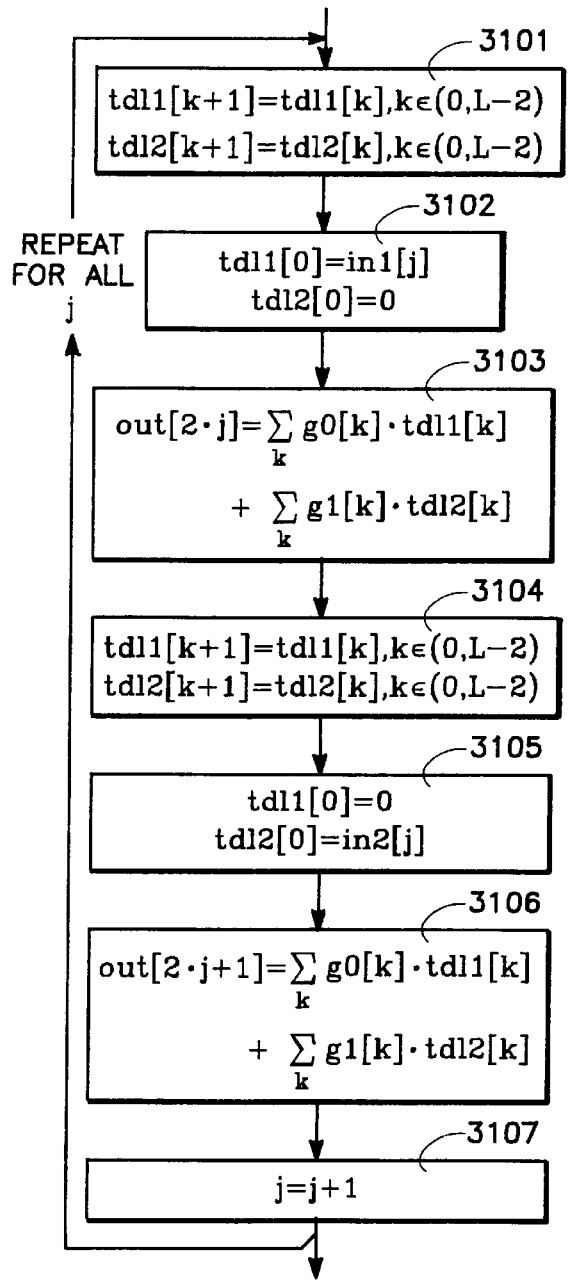
FIG. 31 is a detailed flow chart of unit 2904 in FIG. 31 and unit 3004 in FIG. 30.

Next, unit 2904 combines the two horizontal sub-bands in line y (each of size xs/2) using the function synth which is detailed in FIG. 31 and places the result in vector v(x). Unit 2905 transmits the final samples in each of the two horizontal sub-bands being recombined to the left along the mesh interconnections 68 of the array of decoder 60.

Unit 2906 uses the values received from adjacent processing elements 62 to synthesize the final two points of v(x) for all processing elements 62 except those along the right edge of the array of decoder 60. For these processing elements 62, unit 2907 applies symmetric extension to calculate the final points.

If the maximum amount of parallelism is used, for example, 1 zerotree per processing element 62, unit 2907 must fetch one of the components required for the mirroring (the 2nd argument of synlh) from the processing element 62 to its left. Finally, unit 2908 replaces row y of I(x,y) with the temporary vector v(x) containing the combined horizontal sub-bands and the entire process is repeated for the next line of wavelet coefficients, y.

It should be noted that whenever longer wavelet filters are used, only units 2902, 2903, 2906, and 2907 change to reflect the increased amount of overlap of wavelet coefficients between processing elements 62 and the increase in mirroring at the image borders needed to implement the symmetric extension. Also, the vertical 1D inverse wavelet transform described by FIG. 30 is identical to that described by FIG. 29 with the labels changed. If the data matrix I(x,y) is first transposed, it can be passed a second time through FIG. 29 and then re-transposed in lieu of using the method of FIG. 30.

The operation of the synthesis filtering routine synth is detailed by FIG. 31. The routine of FIG. 31 performs both the filtering and upsampling operations needed to combine two wavelet sub-bands. The first argument is label in1 and the second in2 while g0 is the lowpass wavelet filter kernel and g1 is the highpass kernel. In addition, tdl1 is the tapped delay line corresponding to filter g0 while tdl2 is that corresponding to filter g1. Unit 3101 shifts past inputs down in the delay lines while unit 3102 adds a new sample to the top. The zero is due to upsampling in the highpass channel.

Unit 3103 calculates the first output for the current value of j which is the sum of the high and lowpass filter outputs operating on the upsampled input sequences. Unit 3104 again updates the delay lines and unit 3105 adds the new sample. The zero is due to upsampling in the lowpass channel. Unit 3106 computes a second output point, and unit 3107 increments j by 1. The entire process is repeated until the input is exhausted. Both inputs are always the same length and the output is always the sum of their lengths.

The ":" in FIGS. 29 and 30 are used when referencing synth. The ":" in FIGS. 29 and 30 indicates that v(x) is equal to out, which is produced by FIG. 31, concatenated with what is already stored in v(x) from the earlier synth operations for the current value of y.

Figure 32:
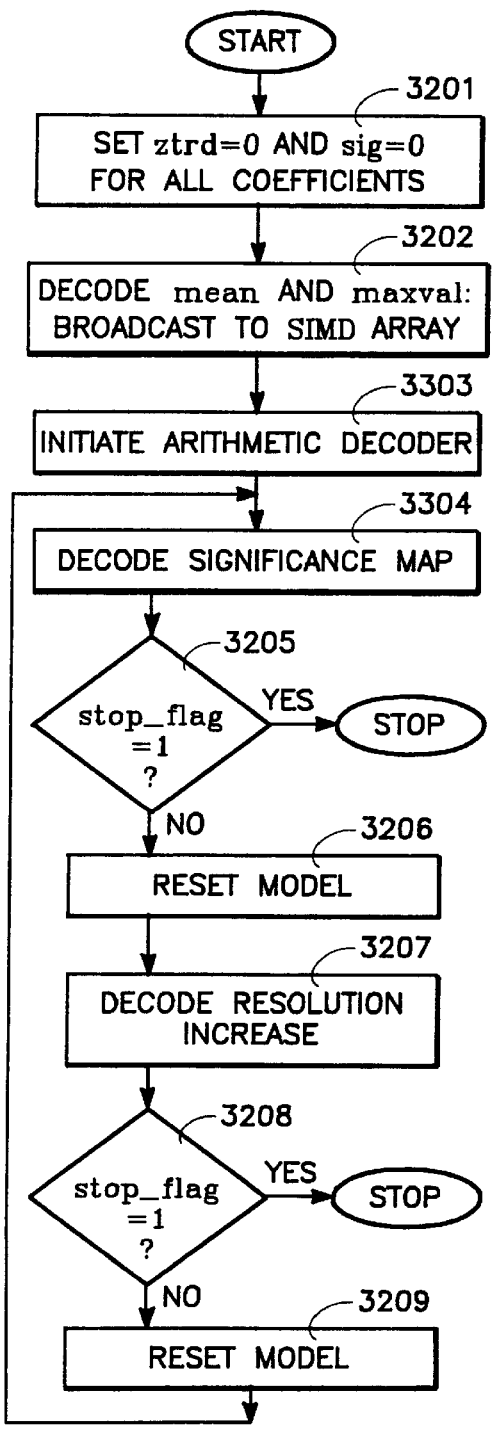
FIG. 32 is the input processor program of the input processor of FIG. 2.

Referring to FIGS. 2, 32 and 35, FIG. 32 details the structure of the software running on input processor 70 of image decoder 60. Unit 3201 sets all ztrd and sig flags to zero with each wavelet coefficient having a set of these flags associated with it. Unit 3202 decodes the mean and maxval from the bit stream, and broadcasts them to the array of processing elements 62 of decoder 60. If each processing element 62 in FIG. 2 has a dual ported memory, then this broadcast is accomplished by writing these quantities into predetermined memory locations within the local memory of each processing element 62 of decoder 60. Unit 3203 initializes the arithmetic decoder 72 and this unit is further broken down in FIG. 35. Arithmetic decoder 72 has the word size set to 16 bits and an alphabet size of 4 symbols.

Unit 3204 accepts the input bits necessary to decode the significance map for a given pass. Unit 3204 is further described in FIG. 33. Unit 3205 checks to see if stop_flag was set by unit 3204 during its last execution. If the answer is "yes", the stop signal is broadcast to all of the processing elements 62 of decoder 60 and the input processing is halted. If the answer is "no", the model is reset by unit 3206 ((see FIG. 23) and the resolution increase is decoded by Unit 3207. FIG. 34 breaks unit 3207 into its constituent parts.

Unit 3208 again checks to see if stop_flag is set and if it is set, unit 2308 sends the stop signal to all of the processing elements 62 of decoder 60 and shuts itself down. Unit 3209 again resets the source model of FIG. 26 and execution of the loop continues until stop_flag equals 1 indicating that all of the bits have been received.

Figure 33:
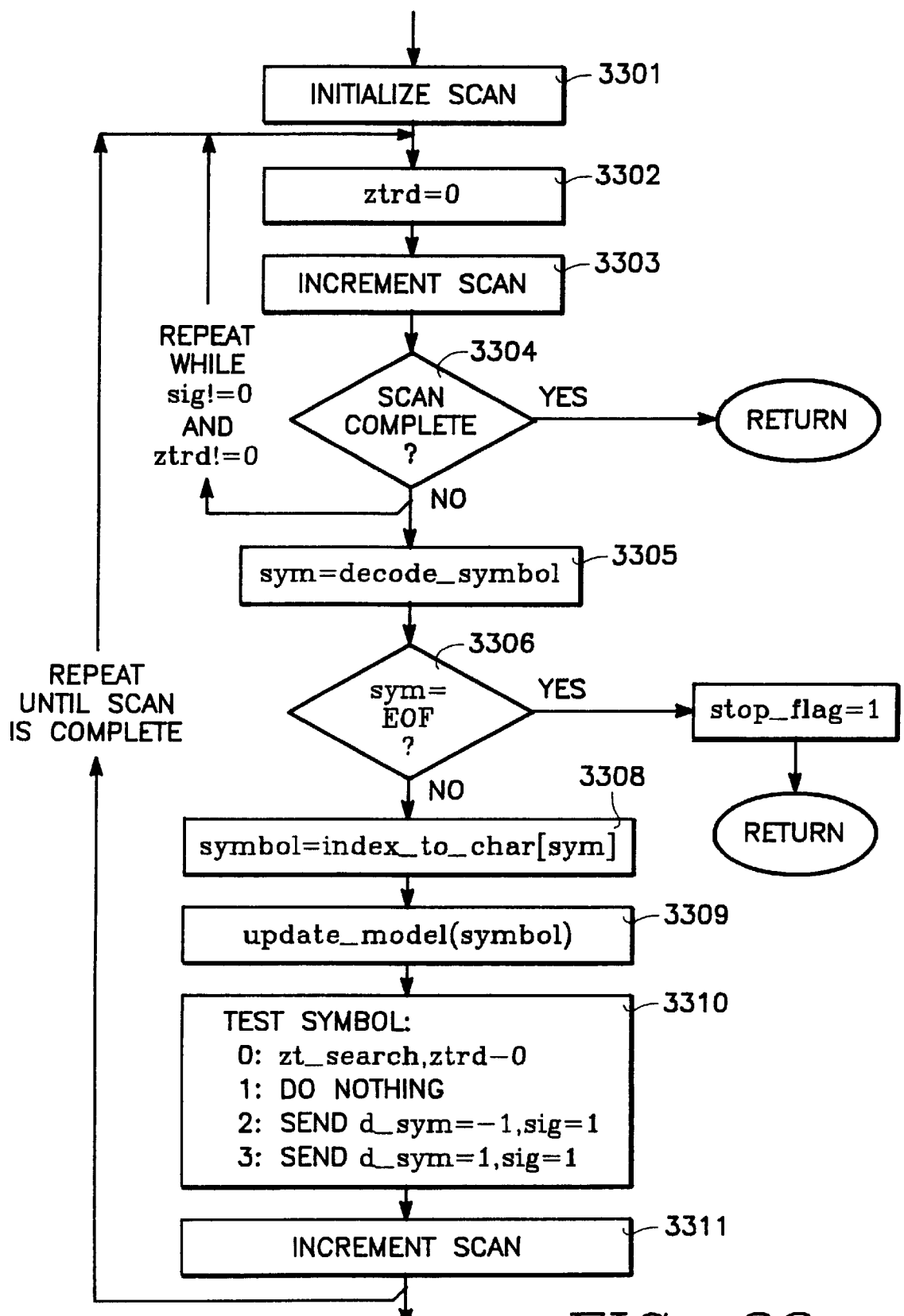
FIG. 33 is a detailed flow chart of the decode significance map of unit 3204 of FIG. 32.
Figure 34A:
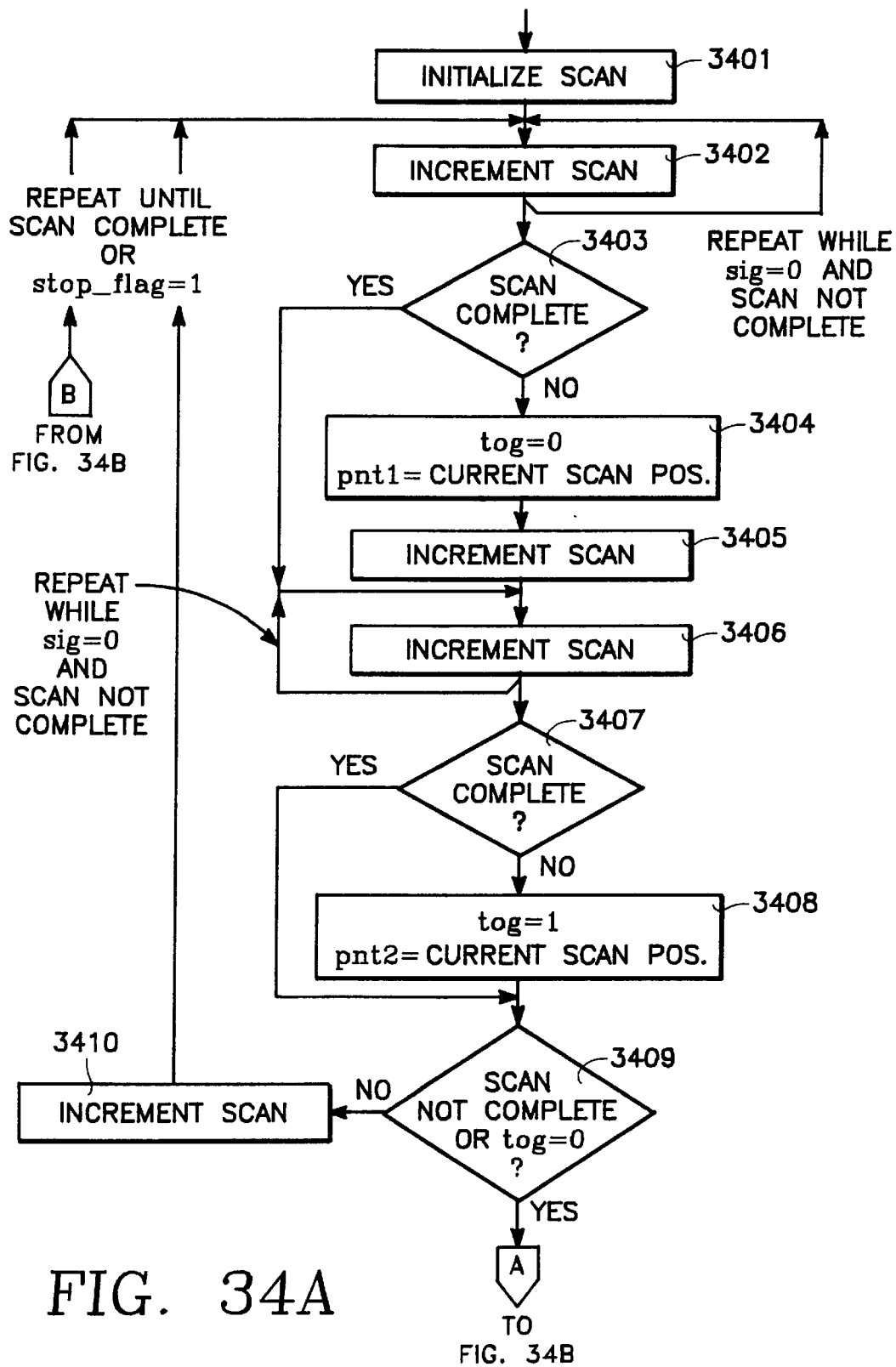
FIGS. 34A and 34B is a detailed flow chart of the decode resolution increase operation of unit 3207 of FIG. 32.
Figure 34B:
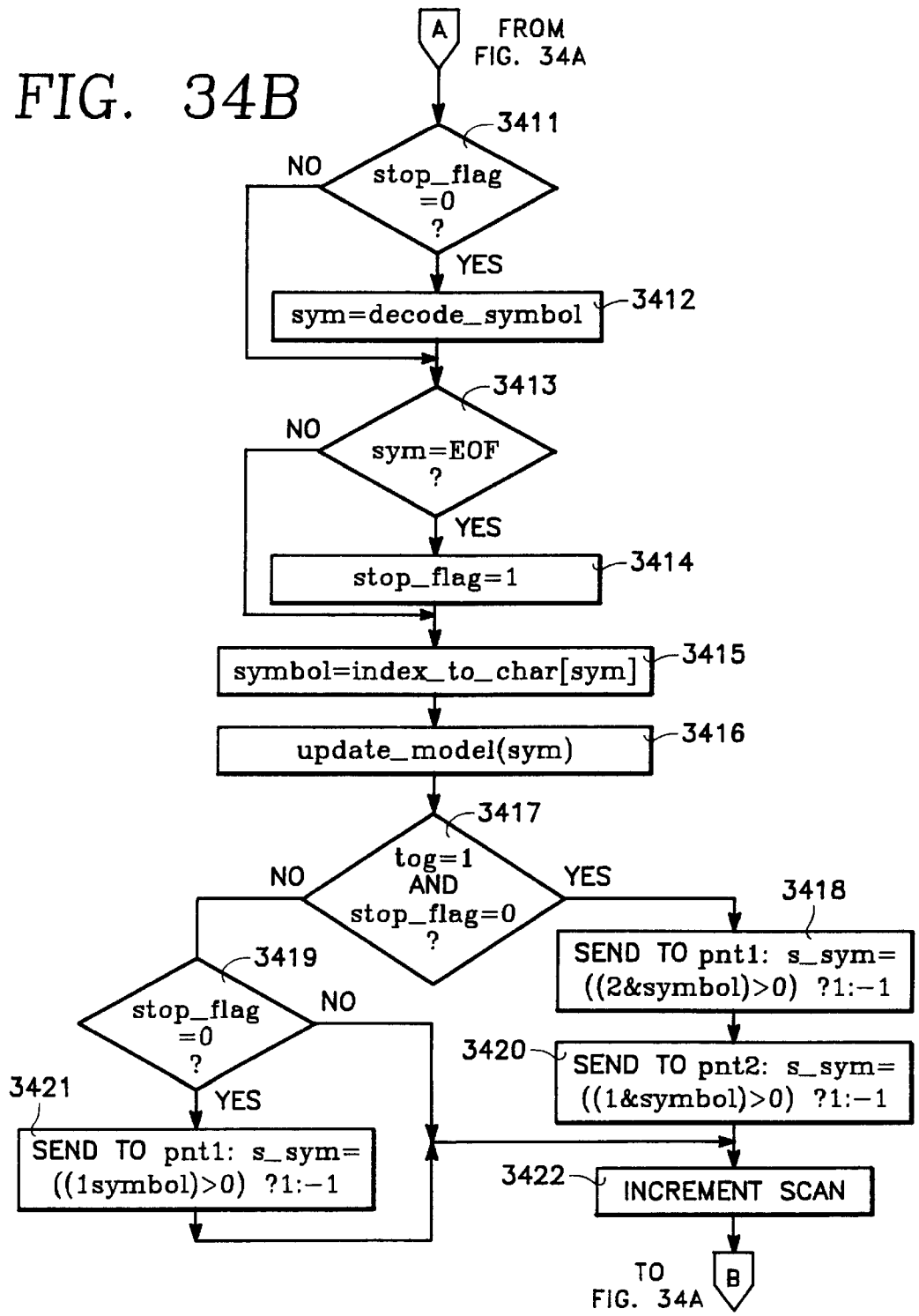

Referring now to FIGS. 2, 32 and 33, FIG. 33 provides details of the operation of unit 3204. Unit 3301 initializes the scanning of the processing elements' memory registers. The scanning used here is the same as that used by image encoder 40 which is described by FIG. 20. Unit 3302 sets flag ztrd, which is associated with the current scan location, equal to 0. Unit 3303 increments the scan to the next location. Unit 3304 checks to see if the scan is complete which requires that all coefficient locations in all processing elements 62 have been scanned. If the answer is yes, execution returns to FIG. 32. If the answer is no, the inner loop is repeated as long as flags sig and ztrd are not equal to 0.

Figure 36:
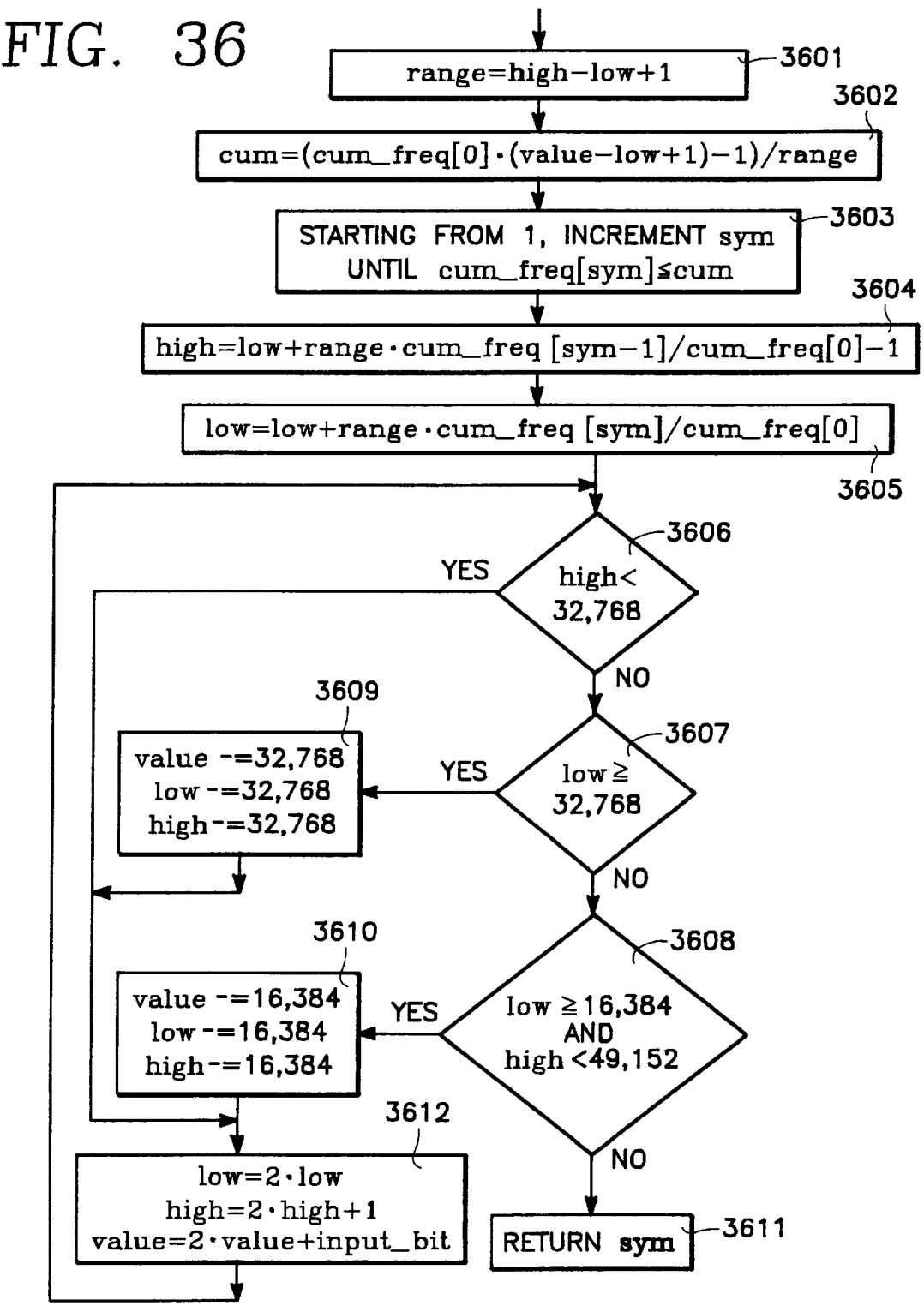
FIG. 36 is a detailed flow chart of the decode-symbol used in FIGS. 33 and 34.

Unit 3305 finds the next symbol index (sym) using decode_symbol which is detailed in FIG. 36. If sym is equal to the end-of-file symbol, EOF, then stop_flag is set and program execution returns to FIG. 32 (unit 3306). If sym is not equal to the end-of-file symbol, unit 3308 converts the index into the actual symbol using a table look-up operation and unit 3309 updates the source model of FIG. 26. Unit 3310 tests the symbol. If the symbol is zero, it sets ztrd=0 for the current scan location and executes zt_search.

Routine zt_search of unit 3310 sets the ztrd flags of all descendants of the wavelet coefficient associated with the current scan location to 1. All descendants of the wavelet coefficient are defined by FIG. 17 with the arrow directions reversed. If symbol equals 1, unit 3310 does nothing. If symbol equals 2, then d_sym=−1 is transmitted to the appropriate processing element 62 of decoder 60 as defined by the current position in the symbol scan. Flag sig is set to 1, indicating that the coefficient is significant. Finally, if symbol is equal to 3, d_sym=1 is sent to the processing element 62 and again sig is set to 1. Unit 3311 increments the scan along the path defined by FIG. 20, and the loop is repeated until the end of the scan is reached.

Referring now to FIG. 34, FIG. 34 describes unit 3207 in detail. As with FIG. 33, the scan is first initialized by unit 3401 and the scanning order is defined by FIG. 20. Unit 3402 is then executed repeatedly, incrementing the scan, as long as sig=0 and the scan is not complete. Unit 3403 checks to see if the scan is complete and, if the scan is not complete, executes units 3404 and 3405. Unit 3404 sets a variable tog=0 and sets a temporary pointer pnt1 equal to the current scan location. Unit 3405 increments the scan. As long as sig=0 and the scan is not complete, unit 3406 is repeatedly called to increment the scan location. Unit 3407 again checks to see if the scan is complete. If the scan is not complete, unit 3408 is executed, setting tog=1 and another temporary pointer pnt2 equal to the current scan location.

Unit 3409 checks to see if either the scan is not complete or tog is equal to zero. If the answer is no, then the scan is incremented by Unit 3410 and program execution returns to the top of the page which is labeled with the letter B. If the condition in unit 3409 is satisfied, then unit 3411 is executed, testing to see if stop_flag is equal to 0. If the answer is yes, unit 3412 decodes the next symbol index sym from the bit stream. The method of FIG. 36 implements units 3305 of FIG. 33 and unit 3412 of FIG. 34

Unit 3413 checks to see if sym is equal to the EOF symbol. If sym is equal to the EOF symbol, unit 3414 sets stop_flag=1. Next, unit 3415 converts the index into the actual transmitted symbol, identified as "symbol", using a table lookup operation. Unit 3416 updates the source model of FIG. 26. Unit 3417 tests to see if both tog=1 and stop flag=0. If the answer is yes, units 3418 and 3420 are executed. If both conditions are not true, unit 3419 is executed.

Unit 3418 sends a value for s_sym to the scan location specified by pnt1 of 1 if the second bit of symbol is greater than 0 and −1 if it is less than 0. Similarly, unit 3420 sends a value for s_sym to the location specified by pnt2 of 1 if the first or least significant bit of symbol is greater than 0 and −1 if it is less than zero. Unit 3419 checks to see if stop_flag is equal to zero. If the answer is yes, unit 3421 sends a value for s_sym to the location specified by pnt1 of 1 if the first bit of symbol is greater than 0 and −1 if it is not greater than 0. Unit 3422 increments the scan location and label B returns program execution to the top of FIG. 34A until either the scan is complete or stop_flag equals 1. This completes the parallel image decoding algorithm.

From the foregoing, it may readily be seen that the present invention comprises a new, unique and exceedingly useful parallel digital image compression system for exploiting zerotree redundancies in wavelet coefficients which constitutes a considerable improvement over the known prior art. Many modifications and variations of the present invention are possible in light of the above teachings. It is to be understood that within the scope of the appended claims the invention may be practiced otherwise than as specifically described.

What is claimed is:

1. A system for processing digital data comprising a plurality of data elements representing an image, said system including:

data processing means, responsive to said data elements, generating coefficients representing said data elements;

said data processing means evaluating said coefficients at successively finer threshold values from larger coarse values to smaller fine values to determine significant and insignificant coefficients, where a coefficient is significant if its magnitude exceeds a given threshold value;

said data processing means, responsive to coefficients evaluated thereby, representing information determined at previous coarse threshold values in the form of (a) a dominant list containing entries of evaluated coefficients that have not as yet been identified as significant at previous coarse threshold values; and (b) a subordinate list containing entries of evaluated coefficients that have been identified as significant at previous coarse threshold values;

said data processing means, responsive to an evaluated coefficient, generating a tree structure having a path from an evaluated coefficient at a level of coarse information to descendant coefficients generated at levels of relatively finer information, where coarse information represents low frequency image information over a given spatial area and fine information represents high frequency image information over a relatively smaller spatial area, each descendant coefficient representing an area corresponding to a portion of an area represented by a root of said tree structure;

said data processing means evaluating entries of coefficients on said lists to generate a plurality of symbols including (a) a first symbol indicating that a coefficient on said dominant list is significant with respect to a current threshold value and exhibits a positive value; (b) a second symbol indicating that a coefficient on said dominant list is significant with respect to a current threshold value and exhibits a negative value: (c) a third symbol indicating that a coefficient on said dominant list is insignificant with respect to a current threshold value, but that there is at least one descendant in the associated tree that is significant with respect to said current threshold value, a last named descendant being insignificant with respect to all prior larger threshold values; and (d) a fourth symbol indicating that a coefficient on said dominant list is insignificant with respect to a current threshold value, and that all descendants in the associated tree, except those found to be significant with respect to a prior larger threshold value, are insignificant with respect to said current threshold value; and coding means coupled to said data processing means to receive said first symbol, said second symbol, said third symbol and said fourth symbol, said coding means coding said first symbol, said second symbol, said third symbol and said fourth symbol to produce an output data bit stream;

said data processing means comprising an array of processing elements, said array having a size of AX rows by AY columns;

each of said processing elements of said array generating at least one zerotree, said at least one zerotree indicating that said coefficient on said dominant list is insignificant with respect to said current threshold value, and that all of said descendants in the associated tree, except those found to be significant with respect to said prior larger threshold value, are insignificant with respect to said current threshold value.

2. The system according to claim 1, wherein said coding means comprises an output digital signal processor, said output digital signal processor consisting of:

a scanning circuit connected to said array of said processing elements; and an arithmetic coder connected to said scanning circuit, said arithmetic coder having an output port, the output port of said arithmetic coder using lossless arithmetic coding to provide said output data bit stream.

3. The system according to claim 2, wherein each of said processing elements of said array comprises:

a single instruction multiple data processor coupled to said processing elements within said array which are adjacent to said single instruction multiple data processor; and a memory coupled to said single instruction multiple data processor.

4. The system according to claim 3, wherein said memory of each of said processing elements comprises a single port memory having an input/output port connected to said single instruction multiple data processor.

5. The system according to claim 3, wherein said memory of each of said processing elements comprises a dual port memory, said dual port memory having a first input/output port connected to said single instruction multiple data processor and a second input/output port connected to said output digital signal processor.

6. The system according to claim 1 wherein each of said coefficients comprises a 5/3 biorthogonal wavelet of Daubechies.

7. The system according to claim 1 wherein said digital data represents said image composed of plurality of picture elements and said data processing means decomposing said image into a plurality of image representative subbands at each of a plurality of decomposition levels, said data processing means producing, for a group of picture elements, a coefficient representing a prescribed characteristic of said picture element group.

* * * * *